United States Patent
Nori et al.

(10) Patent No.: US 11,182,841 B2
(45) Date of Patent: Nov. 23, 2021

(54) PROSPECT RECOMMENDATION

(71) Applicant: ACCENTURE GLOBAL SOLUTIONS LIMITED, Dublin (IE)

(72) Inventors: Ravi Shankar Nori, Bangalore (IN); Vinay Avinash Dorle, Bangalore (IN); Santosh Kumar Soni, Bangalore (IN); Siva Rama Sarma Theerthala, Secunderabad (IN); Sumeet Pushpam, Bangalore (IN); Manu Khanna, Jaipur (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 80 days.

(21) Appl. No.: 16/678,844

(22) Filed: Nov. 8, 2019

(65) Prior Publication Data
US 2021/0142384 A1    May 13, 2021

(51) Int. Cl.
*G06Q 30/06*    (2012.01)
*G06N 5/02*    (2006.01)
*G06Q 30/02*    (2012.01)

(52) U.S. Cl.
CPC ........... *G06Q 30/0631* (2013.01); *G06N 5/02* (2013.01); *G06Q 30/0201* (2013.01)

(58) Field of Classification Search
CPC .... G06Q 30/0202; G06Q 10/02; G06Q 50/30; G06Q 30/0631; G06Q 30/0201;
(Continued)

(56) References Cited

U.S. PATENT DOCUMENTS 8,504,408 B2 * 8/2013 Banthia .................. G06Q 30/02
    705/7.29
8,818,838 B1 * 8/2014 Sharma .............. G06Q 30/0202
    705/7.29
(Continued)

OTHER PUBLICATIONS

Fatima et al. "Product recommendation based on shared customer's behaviour", Oct. 2016, Procedia Computer Science, pp. 136-146 (Year: 2016).*

*Primary Examiner* — Romain Jeanty
(74) *Attorney, Agent, or Firm* — Mannava & Kang, P.C.

(57) ABSTRACT

Examples of prospect recommendation including a prospect recommendation system are provided. The system may receive a prospect assessment query. The system may receive and sort prospect data, sales attribute data, and product data by applying an artificial intelligence component. The system may determine a prospect matrix by correlating the prospect data with the product data. The system may determine a prospect profile by collating historical prospect data and the product data. The system may determine a prospect assessment matrix by correlating the prospect matrix and the prospect profile. The system may determine a decisional pathway based on a comparison between the prospect profile and the prospect assessment matrix. The decisional pathway may include a plurality of assessment interpretations. The system may determine a prospect recommendation index based on the decisional pathway. The prospect recommendation index may facilitate the generation of a prospect assessment result for resolution of the prospect assessment query.

14 Claims, 12 Drawing Sheets

(58) Field of Classification Search
CPC ............ G01C 21/3438; G01C 21/3484; G08G 1/202; G06N 5/02
USPC ....................................................... 705/7.29
See application file for complete search history.

(56) References Cited

U.S. PATENT DOCUMENTS

| | | | |
|---|---|---|---|
| 10,157,411 B1* | 12/2018 | Vasishta | ............. G06Q 30/0631 |
| 10,289,967 B2* | 5/2019 | Stephan | ................ G06Q 10/063 |
| 2010/0049538 A1 | 2/2010 | Frazer et al. | |
| 2014/0278754 A1 | 9/2014 | Cronin et al. | |
| 2016/0140588 A1 | 5/2016 | Bracewell | |
| 2016/0180442 A1* | 6/2016 | Bar | .................... G06Q 30/0631 705/26.7 |
| 2016/0225061 A1* | 8/2016 | Bao | .................... G06Q 30/0631 |
| 2017/0270544 A1 | 9/2017 | Jaidka et al. | |
| 2018/0330192 A1 | 11/2018 | Atasu et al. | |
| 2018/0349324 A1 | 12/2018 | Krappe et al. | |

* cited by examiner

PROSPECT RECOMMENDATION

BACKGROUND

The importance of planning client management operations across various organizations has been increasing with increasing complexities in the sales process. For example, a plethora of sales and marketing tools are available for use in large organizations. The transaction teams may suffer a productivity decline by deploying such disparate tools and techniques. The organizations may need to invest a tremendous amount of resources for enhancing the sales process and overcoming the productivity decline of their sales agents and channel partners.

For technology-intensive industries, the transaction team may require various sales insights keeping in view, for example, similar products, customers, demographics, and previous sales. These insights may be used to generate, modify, update, or amend, for example, a quote for a sales opportunity. The sales insights may enhance the likelihood of the quote conversion into a "Won Deal". Such sales insights may be required by the transaction team instantaneously for effectively managing client operations such as, for example, generating product references and quotations for various clients. However, choosing amongst various disparate systems, tools, and techniques for generating insights may be time-consuming and may lead to loss of sales. In some situations, the transaction team may be required to validate the key insights generated through various labour-intensive processes, thereby causing a delay in responding to a request for quotation and leading to a loss of a potential client and decline in productivity. Such methods for generating insights for salesforce may, therefore, be ineffective and incomplete.

Therefore, to ensure efficiency and completeness, a transaction team may be required to ensure that the sales representatives may be equipped with a prospect analysis and a recommendation system that may provide intelligent recommendations for product upselling, product cross-selling, the appropriate service-level, and appropriate discount percentage and term. There is a need for a prospect recommendation system, which may transform the client management operations of technology-intensive industries to an outcome-based and insight-driven transaction function. There may also be a requirement for a prospect recommendation system for adaptively clustering clients and products of an organization. Additionally, there may be a requirement for using an analytics-centric approach for gathering various client insights.

Accordingly, a technical problem with the currently available systems for generation of sales insights is that they may be inefficient, inaccurate, and/or not scalable. There is a need for a prospect recommendation system that may account for the various factors mentioned above, amongst others, to generate sales quotations, discount quotations, service terms and the like, keeping in view key sales insights in an efficient and cost-effective manner.

DETAILED DESCRIPTION

Figure 1:
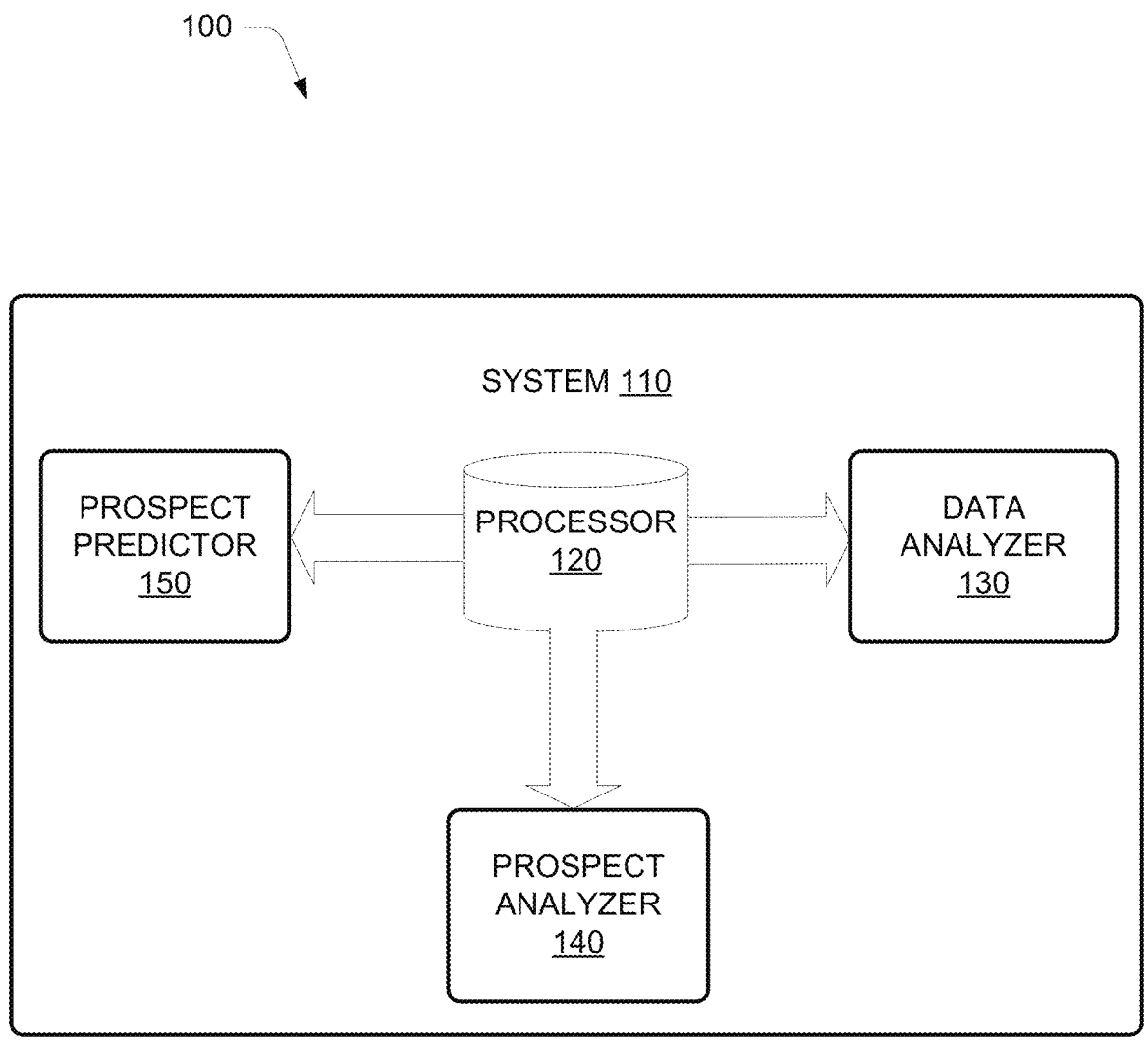
FIG. 1 illustrates a diagram for a prospect recommendation system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to.

The present disclosure describes a system and method for Prospect Recommendation including a Prospect Recommendation System (PRC). The prospect recommendation system (referred to as "system" hereinafter) may be used to process quotations data as applicable to clients in the context of cross-selling and up-selling of products to appropriate clients including but not limited to existing and potential clients, calculating product discounts and determining service-level of clients, based on their demographics and their past purchase patterns and their existing install base. The system may provide product recommendations to clients based on their purchase history of the clients. The system may facilitate the generation of key sales insights with proper justification for the choices made. The system may generate recommendations, which may be interpretable, rather than merely suggesting products, which may have a higher propensity to be bought by clients. In accordance with various embodiments of the present disclosure, the system may derive discounts for products in varied quotations based on the characterization of quotation in terms of involved small and medium enterprises, product attributes and other attributes present at quotation level. More specifically, the discount calculations may be made at a product level within the quotations data and then aggregated to the quotation level. In accordance with various embodiments of the present disclosure, the system may facilitate to determine the enterprise customer service-level through leveraging information present in quotations.

The system may include a processor, a data analyzer, a prospect analyzer, and a prospect predictor. The processor may be coupled to the data analyzer, the prospect analyzer, and the prospect predictor. The data analyzer may receive a query from a user. The query may indicate a prospect assessment requirement. The prospect assessment requirement may be associated with at least one of a process, an organization, and an industry-relevant for client management operations. The data analyzer may receive prospect data and product data from a plurality of data sources. The data analyzer may implement an artificial intelligence component to identify a prospect from the prospect data and sort the prospect data relevant for the identified prospect into a plurality of prospect data domains. The data analyzer may implement the artificial intelligence component to identify a product from the product data and sort the product data relevant for the identified product into a plurality of product data domains. The data analyzer may implement the artificial intelligence component to identify a plurality of attributes associated with the prospect assessment requirement.

The prospect analyzer may determine a prospect matrix by correlating the plurality of prospect data domains with the plurality of product data domains. The prospect matrix may be associated with the prospect assessment requirement. The prospect analyzer may determine a prospect profile by correlating the plurality of prospect data domains with each of the plurality of attributes associated with the prospect assessment requirement. The prospect analyzer may determine a prospect assessment matrix by correlating the prospect matrix with the plurality of attributes. The prospect assessment matrix may include an association between each of the plurality of attributes with each of the plurality of prospect data domains and each of the plurality of product data domains.

The prospect predictor may determine a decisional pathway based on a comparison between the prospect profile and the prospect assessment matrix. The decisional pathway may include a plurality of assessment interpretations. The prospect predictor may assign a confidence score to each of the plurality of assessment interpretations to determine a decisional pathway confidence index. The decisional pathway confidence index may include each of the plurality of product data domains mapped with the plurality of assessment interpretations based on the confidence score assigned to each of the plurality of assessment interpretations. The prospect predictor may determine a prospect recommendation index from the decisional pathway confidence index. The prospect recommendation index to include the plurality of prospect data domains mapped with the plurality of product data domains that may be associated with the plurality of assessment interpretations with a high confidence score. The prospect predictor may generate a prospect assessment result corresponding to the prospect assessment requirement, the prospect assessment result comprising the prospect recommendation index relevant for resolution of the query.

The embodiments for the prospect assessment requirement presented herein are exemplary in nature and should be treated as such. For the sake of brevity and technical clarity, the description of the prospect recommendation system may be restricted to few exemplary embodiments, however, to a person skilled in the art it should be clear that the system may be used for the fulfillment of various sales insight generations and prospect assessment requirements other than those mentioned hereinafter.

Accordingly, the present disclosure aims to provide a prospect recommendation system to generate product quotations, discounts, and service terms for prospective clients and provide the best options available. The present disclosure also provides for efficient and continuous analysis of data required for various sales processes, which in turn provides for efficient insight-driven sales operations while incurring minimal costs. Furthermore, the present disclosure may categorically analyze various parameters that may have an impact on deciding an appropriate quotation regarding products, discounts, service terms and the like.

FIG. 1 illustrates a system for prospect recommendation system 110 (referred to as system 110 hereinafter), according to an example implementation of the present disclosure. In an example, the system 110 may include a processor 120. The processor 120 may be coupled to a data analyzer 130, a prospect analyzer 140 and a prospect predictor 150.

In accordance with an embodiment of the present disclosure, the data analyzer 130 may be configured to receive a query from a user. The query may indicate a prospect assessment requirement. The prospect assessment requirement may be associated with at least one of a process, an organization, and an industry-relevant for client management operations. In an example, the prospect assessment requirement may indicate a requirement, which may refer to a purpose of generating product recommendations for a client for upselling in a corporate environment. For example, the purpose may be to access procurement histories of the various clients for generating product recommendations for a client for cross-selling in a corporate environment. The purpose of the prospect assessment requirement may be to understand and evaluate possible demographic details or a geographical location for augmenting understanding regarding client requirements so as to present a more insight-driven quotation, which may have a higher chance of getting accepted. The purpose of the prospect assessment requirement may be planning for new prospect development projects and generating sales insights for the same. The prospect assessment requirement may be the execution of plans made for sales expansion by an organization. In an example, the prospect assessment requirement may be to adaptively cluster clients based on their procurement behavior and generate product recommendations accordingly. The prospect assessment requirement may be to generate product recommendations for clients for upgrading existing products and/or increasing the number of products to the procurement portfolio. In addition, another requirement may be to search for customers in a similar industry who may have bought similar products. One of ordinary skill in the art will appreciate that what constitutes "similar" may vary from prospect to prospect. For example, a prospect may consider clients who have bought similar products such as, for example, an antenna to be similar in nature. Alternatively, a prospect may consider clients with comparable revenues to be similar. Other definitions for similar may be used to analyze customers without departing from the scope of the disclosure.—The embodiments for the prospect assessment requirements presented herein are exemplary in nature and should be treated as such.

The data analyzer 130 may receive prospect data and product data from a plurality of data sources. In an example, the plurality of data sources may include various internal and external databases, which may be accessible to an organization. The external databases may be various databases related to market research, for example, Gartner®, e-Marketer®, and the like. The external databases may also include websites wherein a new product launch may be announced by various organizations. In an example, the external databases may include websites for various organizations. The internal databases may be, for example, a lead and opportunity management database, an order management database, a product and pricing management database, a marketing operations management database, a service management database and the like along with their existing install base. In accordance with various embodiments of the present disclosure, the prospect data may refer to data related to an existing and/or a potential client (referred to as "prospect" hereinafter) of an organization. In an example, the prospect data may include demographic details for the prospect, products and services, utilized by the prospect, prospect growth potential, prospect purchase likelihood, past lead conversion rate, average deal size, financial value of past purchases, number of purchase orders, frequency of prior orders, existing discounts, existing service terms, highest value of past purchases and the like. In an example, the prospect data may also include revenue, budget, buying power, function, number of employees working in the prospect organization, industry of the prospect organization. In accordance with various embodiments of the present disclosure, the product data may refer to data related to various products, which are sold by an organization. For example, the product data may include cost of products, product hierarchy, service prices, marginal prices, gross margins across various geographical regions, profit margins across various geographical regions, gross margins across product category, profit margins across product category, permissible discounts across various geographical regions, permissible discounts across products, and the like.

The data analyzer 130 may implement an artificial intelligence component to identify a prospect from the prospect data and sort the prospect data relevant for the identified prospect into a plurality of prospect data domains. In accordance with various embodiments of the present disclosure, the artificial intelligence component may include artificial intelligence techniques, for example, Natural Language Processing (NLP) model. The NLP model may be developed using the Language Understanding Intelligent Service (LUIS). The artificial intelligence component may deploy various category intelligence operations based on the NLP model to categorize the prospect data into the plurality of prospect data domains and the plurality of prospect historical data domains. In accordance with various embodiments of the present disclosure, the plurality of prospect data domains may include prospect demographic insights, prospect name, prospect organization name, designation of prospect liaison, prospect organization hierarchy, department in the prospect organization, department of the prospect liaison, prospect geographical area, prospect technology stack, a prospect organization size and the like. In accordance with some embodiments of the present disclosure, the plurality of prospect domains may include a plurality of prospect historical data domains. The plurality of prospect historical data domains may include historical data related to a prospect, which may be available to an organization. For sake of clarity, the term 'plurality of prospect historical data domains' may be used hereinafter for referring to prospect data domains, which may include historical data related to a prospect. The AI component may sort the prospect data into the plurality of prospect data domains and the plurality of prospect historical data domains. In an example, the plurality of prospect historical data domains may include data related to prospect purchase history, for example, prospect products of interest, past lead conversion rate for a prospect, past products purchased, purchase likelihood, financial value of past purchases, average deal size, highest financial value of past purchase, number of prior orders, frequency of prior orders, categories of past product purchases, prospect technology stack, past service-level purchases, past prices and discounts, and the like. The categories included in the plurality of prospect data domains and the plurality of prospect historical data domains are exemplary in nature and should be treated as such. For sake of brevity and technical clarity only a few examples of the plurality of prospect data domains and the plurality of prospect historical data domains have been mentioned herein, however, it should clear to a person skilled in the art that the plurality of prospect data domains may include any type of data associated with a prospect, and the plurality of prospect historical data domains may include any type of historical data associated with a prospect with regards to an organization implementing the system 110.

As mentioned above, the data analyzer 130 may implement the artificial intelligence component to identify a product from the product data and sort the product data relevant for the identified product into a plurality of product data domains. In accordance with various embodiments of the present disclosure, plurality of product data domains may include a list of products on offer by an organization, cost of products, a product hierarchy, a service price, a marginal price, a gross margin across various geographical regions, a profit margin across various geographical regions, a gross margin across product category, a profit margin across product category, a permissible discount across various geographical regions, a permissible discount across products, and the like. For sake of brevity and technical clarity only a few examples of the plurality of product data domains have been mentioned herein, however, it should clear to a person skilled in the art that the plurality of product data domains may include any type of data associated with a product associated with an organization implementing the system 110.

The data analyzer 130 may implement the artificial intelligence component to identify a plurality of attributes associated with the prospect assessment requirement. In accordance with various embodiments of the present disclosure, the plurality of attributes may be identified through the application of a set of category intelligence operations on the prospect data and the product data. The category intelligence operations may include identification of all measurable factors associated with the purpose of the prospect assessment requirement. In an example, the system 110 may identify a new set of attributes for processing each prospect assessment requirement. In an example, the set of attributes identified for a prospect assessment requirement may include at least one set that has been pre-set by a user. The plurality of attributes may include classifications for various product categories, prospect organization class, industry affiliation of the prospect organization, prospect organization size, a maximum permissible discount for a prospect organization class, marketing and trade promotions, and the like (described in detail by way of subsequent Figs). In an example, at least one of the plurality of attributes may be selected by the user. In accordance with various embodiments of the present disclosure, the data analyzer 130 may implement the artificial intelligence component to assess the similarity between various clients, various products purchased by various clients across various industrial sectors. The artificial intelligence component may automatically update the similarities between various clients, various products, and various technical sectors, thereby making the system 110 to be self-updating in nature with regard to assessing the similarity between various clients and their purchase history.

The prospect analyzer 140 may determine a prospect matrix by correlating the plurality of prospect data domains with the plurality of product data domains. The prospect matrix may be associated with the prospect assessment requirement. The prospect matrix may be determined by mapping the plurality of prospect data domains with the plurality of product data domains. For example, the plurality of prospect data domains may include information prospect technology stack, and the plurality of product data domains may include information on the products on offer by an organization. The prospect matrix may map the prospect technology stack with relevant product listings from the plurality of product data domains. In an example, the prospect matrix may map multiple domains from the plurality of prospect data domains onto multiple domains from the plurality of product data domains. For example, the prospect matrix may include the prospect demographic insights, prospect name, prospect organization name, designation of prospect liaison, prospect organization hierarchy, department in the prospect organization, department of the prospect liaison, prospect geographical area, prospect technology stack and the like mapped with cost of products, product hierarchy, service prices, marginal prices, gross margins across various geographical regions, profit margins across various geographical regions, gross margins across product category, profit margins across product category, permissible discounts across various geographical regions, permissible discounts across products, and the like. In an example, the prospect matrix may be a two-dimensional information system for retrieving collated information regarding any of the plurality of prospect data domains mapped with relevant sections of the plurality of product data domains. In accordance with various embodiments of the present disclosure, the prospect matrix may be developed by deploying various algorithms. In an example, the "describe" function of Pandas® package from Python® may be deployed for creating the prospect matrix.

The prospect analyzer 140 may determine a prospect profile by correlating the plurality of prospect data domains with each of the plurality of product data domains and each of the plurality of attributes associated with the prospect assessment requirement. In an example, the prospect analyzer 140 may determine a prospect profile by correlating the plurality of prospect historical data domains with each of the plurality of product data domains and each of the plurality of attributes associated with the prospect assessment requirement. As mentioned above, the plurality of prospect historical data domains may include data related to prospect purchase history, for example, prospect products of interest, past lead conversion rate for a prospect, past products purchased, purchase likelihood, financial value of past purchases, average deal size, highest financial value of past purchase, number of prior orders, frequency of prior orders, categories of past product purchases, prospect technology stack, past service-level purchases, past prices and discounts, and the like. The prospect analyzer 140 may map each of the plurality of prospect historical data domains with each of the plurality of product data domains, for example, cost of products, the product hierarchy, the service price, the marginal price, the gross margin across various geographical regions, the profit margin across various geographical regions, the gross margin across product category, the profit margin across product category, the permissible discount across various geographical regions, the permissible discount across products, and the like. For example, mapping the past products purchased with the product hierarchy may indicate products, which may be required to be updated by the prospect. In an example, the prospect profile may include mapping past service-level purchases, and past prices and discounts from the plurality of prospect historical data domains with the service prices, the marginal prices, the gross margins, and the profit margins for obtaining financial data that would be required for generating an upselling or cross-selling quotation for a prospect. The prospect profile may facilitate the generation of insights regarding a particular prospect with respect to the plurality of attributes and the plurality of product data domains. The prospect profile may include each of the plurality of prospect historical data domains mapped with each of the plurality of attributes. In an example, the prospect profile may include past classifications for various product categories purchased by a prospect, past prospect organization class, past prospect organization size, maximum permissible discounts for the prospect organization class in the past, past marketing and trade promotions, and the like. For sake of brevity and technical clarity only a few examples of the prospect profile mapping have been mentioned herein, however, it should clear to a person skilled in the art that the prospect profile may include any type of data association between the plurality of prospect historical data domains and the plurality of product data domains and the plurality of attributes. In accordance with various embodiments of the present disclosure, the prospect profile may be developed by deploying various algorithms. In an example, the "describe" function of Pandas® package from Python® may be deployed for creating the prospect profile.

The prospect analyzer 140 may determine a prospect assessment matrix by correlating the prospect matrix with the plurality of attributes. The prospect assessment matrix may include an association between each of the plurality of attributes with each of the plurality of prospect data domains and each of the plurality of product data domains. For example, the prospect assessment matrix may include a cluster including a past price and a past discount for a particular product and for a particular service term mapped onto a particular prospect. In an example, the prospect assessment matrix may include a past price and a past discount for a particular product for a particular geographical region for a particular class of products mapped onto multiple prospects. The prospect assessment matrix may generate insights regarding products from a same consumer class, products from similar industry, products from a similar geographical region, products purchased with a particular service class, a service-level purchase from similar customers, a number of service requests for similar products, a number of finalised deals, and the like. The prospect assessment matrix may generate insights regarding the number of products with maximum finalized deals and the number of products with least number of finalized deals. Such insights may be deployed by a sales team while making strategic plans for sales and marketing (explained further in detail by way of subsequent Figs). For sake of brevity and technical clarity only few examples of the prospect assessment matrix have been mentioned herein, however, it should clear to a person skilled in the art that the prospect assessment matrix may include any of the plurality of product data domains, any of the plurality of attributes mapped onto any of the plurality of product domains. In an example, a spectral co-clustering algorithm may be deployed for creation of the prospect matrix. The spectral co-clustering algorithm may find biclusters with values higher than those in the corresponding other rows and columns. Each row and each column may belong to exactly one bicluster, so rearranging the rows and columns to make partitions contiguous reveals these high values along the diagonal. In an example, a function spectral co-clustering from Sklearn® python package may be used for co-clustering and co-cluster may be plotted using the Pyplot® function of Matplotlib® package. The prospect assessment matrix may provide a list of products, which may have a high likelihood of being purchased by a prospect.

The prospect predictor 150 may determine a decisional pathway based on a comparison between the prospect profile and the prospect assessment matrix. The prospect predictor 150 may compare the prospect assessment matrix with the prospect profile including past purchase history of a prospect mapped with the plurality of product data domains. The comparison may lead to insights such as a list of products that may be of interest to the prospect based on products purchased by other prospects from similar organization class, similar geographical region, and the like. For the sake of brevity and technical clarity only a few examples of the prospect assessment matrix have been mentioned herein, however, it should clear to a person skilled in the art that the decisional pathway may include any insights generated from the prospect profile mapping onto the prospect assessment matrix. In an example, the decisional pathway may be presented to the user of the system 110 in the form of a decision tree.

The decisional pathway may include a plurality of assessment interpretations. The plurality of assessment interpretations may be a set of decision points in the decisional pathway. In an example, each of the plurality of assessment interpretations may represent a particular product or a service related to a product from the prospect assessment matrix. In an example, each of the plurality of assessment interpretations may represent an insight generated from the comparison of the prospect profile and the prospect assessment matrix. In an example, each of the plurality of assessment interpretations may indicate the likelihood of achieving sales success. In an example, each of the plurality of assessment interpretations may further include a likelihood value pertaining to the association between the prospect profile and a value from the prospect assessment matrix. The prospect predictor 150 may construct the decisional pathway on the basis of the likelihood value of the plurality of assessment interpretations. Each of the plurality of assessment interpretations may represent an association between the prospect profile and the prospect assessment matrix. In an example, each of the likelihood values may represent a likelihood of an association between the prospect profile and the prospect assessment matrix. The prospect predictor 150 may analyze each of the plurality of assessment interpretations for creating subsequent assessment points from the plurality of assessment interpretations. In an example, each of the plurality of assessment interpretations may be interlinked to each other based on the analysis of the relationship between the prospect profile and the prospect assessment matrix (explained in detail by way of subsequent Figs). In an example, the decisional pathway may include a plurality of offshoot decisional pathways. Each of the plurality of offshoot decisional pathways may include a set of interlinked assessment interpretations from the plurality of assessment interpretations. In an example, each of the plurality of offshoot decisional pathways may be linked to each other (explained in detail by way of subsequent Figs).

The prospect predictor 150 may assign a confidence score to each of the plurality of assessment interpretations to determine a decisional pathway confidence index. The confidence score may be a weightage assigned to a particular assessment interpretation from the plurality of assessment interpretations. The weightage assigned to a particular assessment interpretation from the plurality of assessment interpretations in the form of the confidence score may be dynamic in nature. The dynamic weightage may be assigned automatically by the system 110 to a particular assessment interpretation. The system 110 may automatically update a weightage assigned to a particular assessment interpretation for a future reference purpose. For example, a change in revenue of an organization may be given a higher weightage $|_{[KM1]}$as compared to higher revenue influencing purchasing decisions. The prospect predictor 150 may determine the decisional pathway confidence index for each of the plurality of offshoot decisional pathways based on the confidence score assigned to each of the associated plurality of prospect assessments. The decisional pathway confidence index may include each of the plurality of product data domains mapped with the plurality of assessment interpretations based on the confidence score assigned to each of the plurality of assessment interpretations (explained in detail by way of subsequent Figs). In an example, the decisional pathway confidence index may include each of the plurality of product data domains mapped with the plurality of offshoot decisional pathways based on the confidence score assigned to each of the plurality of assessment interpretations for that particular offshoot decisional pathway. In an example, a high decisional pathway confidence index may be interpreted as the insights generated therefrom may have a higher relevance towards the generation of various product and service recommendations for a prospect. The decisional pathway may validate the list of products generated by the prospect assessment matrix as having a high likelihood of being purchased by a prospect.

The prospect predictor 150 may determine a prospect recommendation index from the decisional pathway confidence index. The prospect recommendation index may include the plurality of prospect data domains mapped with the plurality of product data domains that are associated with the plurality of assessment interpretations with a high confidence score. The prospect recommendation index may include a list of products, a list of services, and a list of discount quotations, which may have a high likelihood of being accepted by a prospect (explained in detail by way of subsequent Figs). The prospect recommendation index may include the list of products for a particular prospect, which may have been successfully validated by the decisional pathway as having a high likelihood of being purchased by a prospect. The prospect predictor 150 may generate a prospect assessment result corresponding to the prospect assessment requirement. The prospect assessment result comprising the prospect recommendation index relevant for the resolution of the query. In an example, the prospect assessment result may be an electronic document comprising various products and services recommended for a client-generated for the user in response to the query.

In accordance with various embodiments of the present disclosure, the prospect predictor 150 may determine a product concession index based on the prospect profile and the prospect recommendation index. The product concession index may include a plurality of concessions associated with each of the plurality of product data domains attributed to a prospect from the plurality of prospect data domains. In an example, the prospect predictor 150 may deploy an algorithmic medium to determine each of the plurality of concessions and assign a confidence value based on the algorithmic medium to each of the plurality of concessions. The algorithmic medium may be an algorithm, which may be used to determine a concession from the plurality of concessions (explained in detail by way of FIG. 2). The confidence value may be a weightage assigned to the algorithm, which may be deployed for determining a concession from the plurality of concessions. The system 110 may calculate an average value from all confidence values for generating the product concession index.

The plurality of concessions may be a set of discount quotations generated by the system 110 for processing the prospect assessment requirement. The system 110 may generate optimal product discounts customized for each prospect based on a past purchase history of the prospect, the product cost, the margin costs, maximum discounts permissible for a particular class of prospects, and the like. In an example, the system 110 may generate multiple discount quotations for a single prospect, wherein, each of the discount quotations may be based on a set of assessment interpretations from the plurality of assessment interpretations present in the decisional pathway.

In an example, the system 110 may further create a prospect assessment library, by associating the prospect recommendation index, and the prospect profile with the prospect assessment requirement. The system 110 may deploy the prospect assessment library for validation of the prospect recommendation index. The prospect assessment library may be deployed for processing subsequent prospect assessment requirements. In an example, the plurality of data sources may include the prospect assessment library.

The embodiments for the prospect assessment requirement presented herein are exemplary in nature and should be treated as such. For the sake of brevity and technical clarity, the description of the prospect recommendation system may be restricted to few exemplary embodiments, however, to a person skilled in the art it should be clear that the system may be used for the fulfillment of various sales insight generations and prospect assessment requirements other than those mentioned hereinafter.

Figure 2:
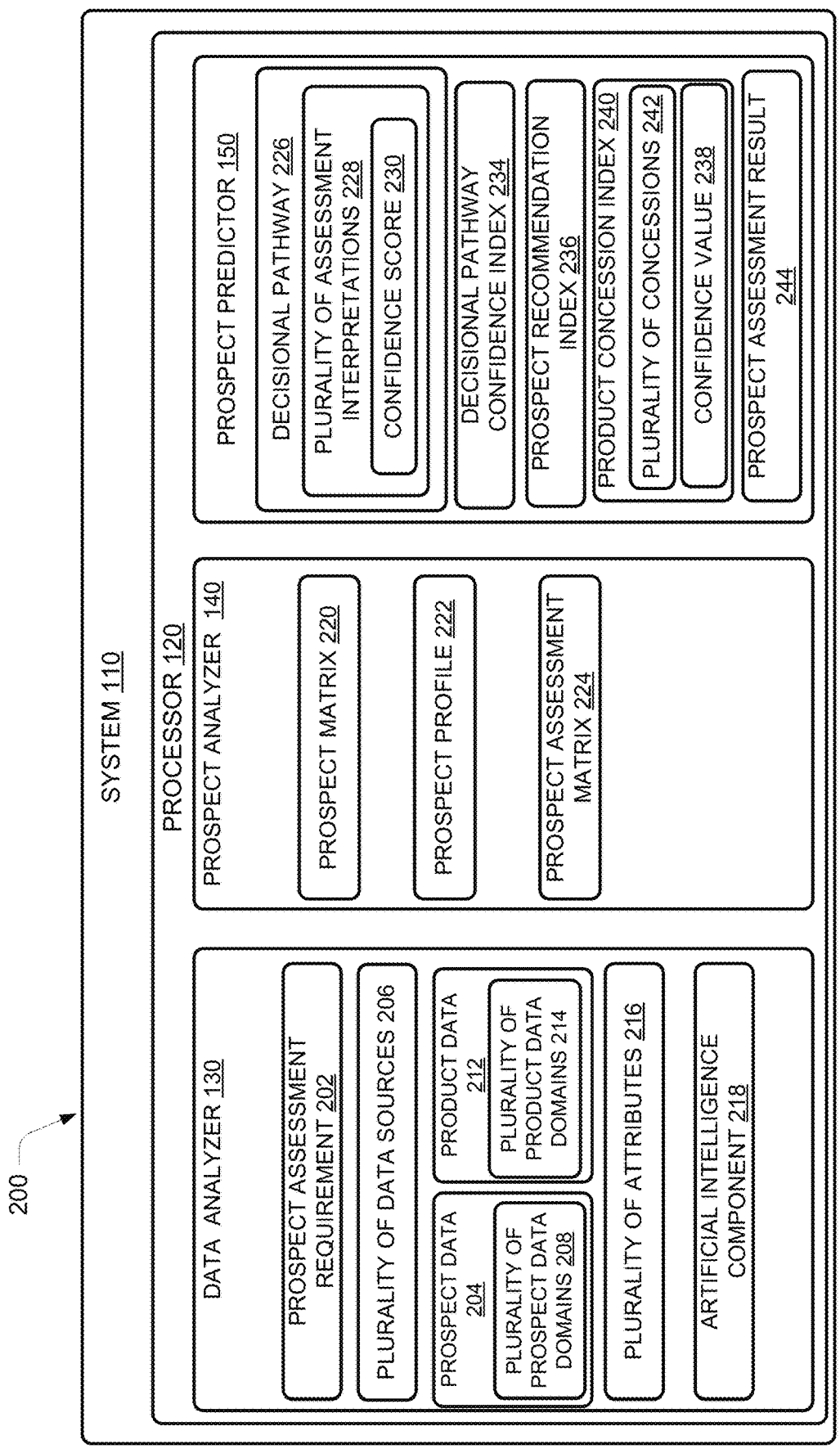
FIG. 2 illustrates various components of a prospect recommendation system, according to an example embodiment of the present disclosure.

FIG. 2 illustrates various components of the prospect recommendation system 110, according to an example embodiment of the present disclosure. In an example, the system 110 may include the processor 120. The processor 120 may be coupled to the data analyzer 130, the prospect analyzer 140 and the prospect predictor 150.

In accordance with an embodiment of the present disclosure, the data analyzer 130 may be configured to receive a query from a user. The query may indicate a prospect assessment requirement 202. The prospect assessment requirement 202 may be associated with at least one of a process, an organization, and an industry-relevant for client management operations. In an example, the prospect assessment requirement 202 may indicate a requirement, which may refer to a purpose of generating product recommendations for a client for upselling in a corporate environment. For example, the purpose may be to access procurement histories of the various clients for generating product recommendations for a client for cross-selling in a corporate environment. The purpose of the prospect assessment requirement 202 may be to understand and evaluate possible demographic |details $_{[KSS2]}$ or a geographical location for augmenting understanding regarding client requirements so as to present a more insight-driven quotation, which may have a higher chance of getting accepted. The purpose of the prospect assessment requirement 202 may be planning for new prospect development projects and generating sales insights for the same. The prospect assessment requirement 202 may be the execution of plans made for sales expansion by an organization. In an example, the prospect assessment requirement 202 may be to adaptively cluster clients based on their procurement behavior and generate product recommendations accordingly. The prospect assessment requirement 202 may be to generate product recommendations for clients for upgrading existing products and/or increasing the number of products to the procurement portfolio. The embodiments for the prospect assessment requirements 202 presented herein are exemplary in nature and should be treated as such.

The data analyzer 130 may receive prospect data 204 and product data 212 from a plurality of data sources 206. In an example, the plurality of data sources 206 may include various internal and external databases, which may be accessible to an organization. The internal databases may be, for example, a lead and opportunity management database, an order management database, a product and pricing management database, a marketing operations management database, a service management database and the like. In accordance with various embodiments of the present disclosure, the prospect data 204 may refer to data related to an existing and/or a potential client (referred to as "prospect" hereinafter) of an organization. In an example, the prospect data 204 may include demographic details for the prospect, products and services, utilized by the prospect, prospect growth potential, prospect purchase likelihood, past lead conversion rate, average deal size, financial value of past purchases, number of purchase orders, frequency of prior orders, existing discounts, existing service terms, highest value of past purchases and the like. In an example, the prospect data 204 may also include revenue, budget, buying power, function, number of employees working in the prospect organization, industry of the prospect organization.

In accordance with various embodiments of the present disclosure, the product data 212 may refer to data related to various products, which are sold by an organization. For example, the product data 212 may include cost of products, product hierarchy, service prices, marginal prices, gross margins across various geographical regions, profit margins across various geographical regions, gross margins across product category, profit margins across product category, permissible discounts across various geographical regions, permissible discounts across products, and the like.

The data analyzer 130 may implement an artificial intelligence component 218 to identify a prospect from the prospect data 204 and sort the prospect data 204 relevant for the identified prospect into a plurality of prospect data domains 208. In accordance with various embodiments of the present disclosure, the artificial intelligence component 218 may include artificial intelligence techniques, for example, Natural Language Processing (NLP) model. The NLP model may be developed using the Language Understanding Intelligent Service (LUIS). The artificial intelligence component 218 may deploy various category intelligence operations based on the NLP model to categorize the prospect data 204 into the plurality of prospect data domains 208 and the plurality of prospect historical data domains. In accordance with various embodiments of the present disclosure, the plurality of prospect data domains 208 may include prospect demographic insights, prospect name, prospect organization name, designation of prospect liaison, prospect organization hierarchy, department in the prospect organization, department of the prospect liaison, prospect geographical area, prospect technology stack and the like. In accordance with some embodiments of the present disclosure, the plurality of prospect domains may include a plurality of prospect historical data domains. The plurality of prospect historical data domains may include historical data related to a prospect, which may be available to an organization. For sake of clarity, the term 'plurality of prospect historical data domains' may be used hereinafter for referring to prospect data domains, which may include historical data related to a prospect. In an example, the plurality of prospect historical data domains may include data related to prospect purchase history, for example, prospect products of interest, past lead conversion rate for a prospect, past products purchased, purchase likelihood, financial value of past purchases, average deal size, highest financial value of past purchase, number of prior orders, frequency of prior orders, categories of past product purchases, prospect technology stack, past service-level purchases, past prices and discounts, and the like. The categories included in the plurality of prospect data domains 208 and the plurality of prospect historical data domains are exemplary in nature and should be treated as such. For sake of brevity and technical clarity only a few examples of the plurality of prospect data domains 208 and the plurality of prospect historical data domains have been mentioned herein, however, it should clear to a person skilled in the art that the plurality of prospect data domains 208 may include any type of data associated with a prospect, and the plurality of prospect historical data domains may include any type of historical data associated with a prospect with regards to an organization implementing the system 110.

As mentioned above, the data analyzer 130 may implement the artificial intelligence component 218 to identify a product from the product data 212 and sort the product data 212 relevant for the identified product into a plurality of product data domains 214. In accordance with various embodiments of the present disclosure, plurality of product data domains 214 may include a list of products on offer by an organization, cost of products, a product hierarchy, a service price, a marginal price, a gross margin across various geographical regions, a profit margin across various geographical regions, a gross margin across product category, a profit margin across product category, a permissible discount across various geographical regions, a permissible discount across products, and the like. For sake of brevity and technical clarity only a few examples of the plurality of product data domains 214 have been mentioned herein, however, it should clear to a person skilled in the art that the plurality of product data domains 214 may include any type of data associated with a product associated with an organization implementing the system 110.

The data analyzer 130 may implement the artificial intelligence component 218 to identify a plurality of attributes 216 associated with the prospect assessment requirement 202. In accordance with various embodiments of the present disclosure, the plurality of attributes 216 may be identified through the application of a set of category intelligence operations on the prospect data 204 and the product data 212. The category intelligence operations may include identification of all measurable factors associated with the purpose of the prospect assessment requirement 202. In an example, the system 110 may identify a new set of attributes for processing each prospect assessment requirement 202. In an example, the set of attributes identified for a prospect assessment requirement 202 may include at least one set that has been pre-set by a user. The plurality of attributes 216 may include classifications for various product categories, prospect organization class, industry affiliation of the prospect organization, prospect organization size, maximum permissible discounts for a prospect organization class, marketing and trade promotions, and the like (described in detail by way of subsequent Figs).

The prospect analyzer 140 may determine a prospect matrix 220 by correlating the plurality of prospect data domains 208 with the plurality of product data domains 214. The prospect matrix 220 may be associated with the prospect assessment requirement 202. The prospect matrix 220 may be determined by mapping the plurality of prospect data domains 208 with the plurality of product data domains 214. For example, the plurality of prospect data domains 208 may include information prospect technology stack, and the plurality of product data domains 214 may include information on the products on offer by an organization. The prospect matrix may map the prospect technology stack with relevant product listings from the plurality of product data domains 214. In an example, the prospect matrix may map multiple domains from the plurality of prospect data domains 208 onto multiple domains from the plurality of product data domains 214. For example, the prospect matrix may include the prospect demographic insights, prospect name, prospect organization name, designation of prospect liaison, prospect organization hierarchy, department in the prospect organization, department of the prospect liaison, prospect geographical area, prospect technology stack and the like mapped with cost of products, product hierarchy, service prices, marginal prices, gross margins across various geographical regions, profit margins across various geographical regions, gross margins across product category, profit margins across product category, permissible discounts across various geographical regions, permissible discounts across products, and the like. In an example, the prospect matrix may be a two-dimensional information system for retrieving collated information regarding any of the plurality of prospect data domains 208 mapped with relevant sections of the plurality of product data domains 214. In accordance with various embodiments of the present disclosure, the prospect matrix may be developed by deploying various algorithms. In an example, the "describe" function of Pandas® package from Python® may be deployed for creating the prospect matrix.

The prospect analyzer 140 may determine a prospect profile 222 by correlating the plurality of prospect historical data domains with each of the plurality of product data domains 214 and each of the plurality of attributes 216 associated with the prospect assessment requirement 202. As mentioned above, the plurality of prospect historical data domains may include data related to prospect purchase history, for example, prospect products of interest, past lead conversion rate for a prospect, past products purchased, purchase likelihood, financial value of past purchases, average deal size, highest financial value of past purchase, number of prior orders, frequency of prior orders, categories of past product purchases, prospect technology stack, past service-level purchases, past prices and discounts, and the like. The prospect analyzer 140 may map each of the plurality of prospect historical data domains with each of the plurality of product data domains 214, for example, cost of products, the product hierarchy, the service price, the marginal price, the gross margin across various geographical regions, the profit margin across various geographical regions, the gross margin across product category, the profit margin across product category, the permissible discount across various geographical regions, the permissible discount across products, and the like. For example, mapping the past products purchased with the product hierarchy may indicate products, which may be required to be updated by the prospect. In an example, the prospect profile 222 may include mapping past service-level purchases, and past prices and discounts from the plurality of prospect historical data domains with the service prices, the marginal prices, the gross margins, and the profit margins for obtaining financial data that would be required for generating an upselling or cross-selling quotation for a prospect. The prospect profile 222 may facilitate the generation of insights regarding a particular prospect with respect to the plurality of attributes 216 and the plurality of product data domains 214. The prospect profile 222 may include each of the plurality of prospect historical data domains mapped with each of the plurality of attributes 216. In an example, the prospect profile 222 may include past classifications for various product categories purchased by a prospect, past prospect organization class, past prospect organization size, maximum permissible discounts for the prospect organization class in the past, past marketing and trade promotions, and the like. For sake of brevity and technical clarity only a few examples of the prospect profile 222 mappings have been mentioned herein, however, it should clear to a person skilled in the art that the prospect profile 222 may include any type of data association between the plurality of prospect historical data domains and the plurality of product data domains 214 and the plurality of attributes 216. In accordance with various embodiments of the present disclosure, the prospect profile 222 may be developed by deploying various algorithms. In an example, the "describe" function of Pandas® package from Python® may be deployed for creating the prospect profile 222.

The prospect analyzer 140 may determine a prospect assessment matrix 224 by correlating the prospect matrix 220 with the plurality of attributes 216. The prospect assessment matrix 224 may include an association between each of the plurality of attributes 216 with each of the plurality of prospect data domains 208 and each of the plurality of product data domains 214. For example, the prospect assessment matrix 224 may include a cluster including a past price and a past discount for a particular product and for a particular service term mapped onto a particular prospect. In an example, the prospect assessment matrix 224 may include a past price and a past discount for a particular product for a particular geographical region for a particular class of products mapped onto multiple prospects. The prospect assessment matrix 224 may generate insights regarding products from a same consumer class, products from similar industry, products from a similar geographical region, products purchased with a particular service class, a service-level purchase from similar customers, a number of service requests for similar products, a number of finalised deals, and the like. The prospect assessment matrix 224 may generate insights regarding the number of products with maximum finalized deals and the number of products with least number of finalized deals. Such insights may be deployed by a sales team while making strategic plans for sales and marketing (explained further in detail by way of subsequent Figs). For sake of brevity and technical clarity only few examples of the prospect assessment matrix 224 have been mentioned herein, however, it should clear to a person skilled in the art that the prospect assessment matrix 224 may include any of the plurality of product data domains 214, any of the plurality of attributes 216 mapped onto any of the plurality of product domains. In an example, a spectral co-clustering algorithm may be deployed for creation of the prospect matrix. The spectral co-clustering algorithm may find biclusters with values higher than those in the corresponding other rows and columns. Each row and each column may belong to exactly one bicluster, so rearranging the rows and columns to make partitions contiguous reveals these high values along the diagonal. In an example, a function spectral co-clustering from Sklearn® python package may be used for co-clustering and co-cluster may be plotted using the Pyplot® function of Matplotlib® package.

The prospect predictor 150 may determine a decisional pathway 226 based on a comparison between the prospect profile 222 and the prospect assessment matrix 224. The prospect predictor 150 may compare prospect assessment matrix 224 with the prospect profile 222 including past purchase history of a prospect mapped with the plurality of product data domains 214. The comparison may lead to insights such as a list of products that may be of interest to the prospect based on products purchased by other prospects from similar organization class, similar geographical region, and the like. For the sake of brevity and technical clarity only a few examples of the prospect assessment matrix 224 have been mentioned herein, however, it should clear to a person skilled in the art that the decisional pathway 226 may include any insights generated from the prospect profile 222 mappings onto the prospect assessment matrix 224. In an example, decisional pathway 226 may be presented to the user of the system 110 in the form of a decision tree. In an example, the decisional pathway 226 may be built with a random classifier model of sklearn Python® package and a tree may be plotted using an export_graphviz Function®. The Graphviz Function® may export a decision tree in a DOT® format in Python®. For sake of brevity and technical clarity, the details of Graphviz Function® have not been mentioned herein, however, such details would be clear to a person skilled in the art.

The decisional pathway 226 may include a plurality of assessment interpretations 228. The plurality of assessment interpretations 228 may be a set of decision points in the decisional pathway 226. In an example, each of the plurality of assessment interpretations 228 may represent an insight generated from the comparison of the prospect profile 222 and the prospect assessment matrix 224. In an example, each of the plurality of assessment interpretations 228 may further include a likelihood value 232 pertaining to the association between the prospect profile 222 and a value from the prospect assessment matrix 224. The prospect predictor 150 may construct the decisional pathway 226 on the basis of the likelihood value 232 of the plurality of assessment interpretations 228. Each of the plurality of assessment interpretations 228 may represent an association between the prospect profile 222 and the prospect assessment matrix 224. In an example, each of the likelihood value 232 may represent a likelihood of a positive relationship between the prospect profile 222 and the prospect assessment matrix 224. The prospect predictor 150 may analyze each of the plurality of assessment interpretations 228 for creating subsequent assessment points from the plurality of assessment interpretations 228. In an example, each of the plurality of assessment interpretations 228 may be interlinked to each other based on the analysis of the relationship between the prospect profile and the prospect assessment matrix (explained in detail by way of subsequent Figs). In an example, the decisional pathway 226 may include a plurality of offshoot decisional pathways 226. Each of the plurality of offshoot decisional pathways 226 may include a set of interlinked assessment interpretations from the plurality of assessment interpretations 228. In an example, each of the plurality of offshoot decisional pathways 226 may be linked to each other (explained in detail by way of subsequent Figs).

The prospect predictor 150 may assign a confidence score 230 to each of the plurality of assessment interpretations 228 to determine a decisional pathway confidence index 234. The confidence score 230 may be a weightage assigned to a particular assessment interpretation from the plurality of assessment interpretations 228. For example, a change in revenue of an organization may be given a higher weightage as compared to, for example, purchase likelihood as a higher revenue may influence purchasing decisions positively. The decisional pathway confidence index 234 may include each of the plurality of product data domains 214 mapped with the plurality of assessment interpretations 228 based on the confidence score 230 assigned to each of the plurality of assessment interpretations 228 (explained in detail by way of subsequent Figs). In an example, the decisional pathway confidence index 234 may include each of the plurality of product data domains 214 mapped with the plurality of offshoot decisional pathways 226 based on the confidence score 230 assigned to each of the plurality of assessment interpretations 228 for that particular offshoot decisional pathway 226. In an example, a high decisional pathway confidence index 234 may be interpreted as the insights generated therefrom may have a higher relevance towards the generation of various product and service recommendations for a prospect.

The prospect predictor 150 may determine a prospect recommendation index 236 from the decisional pathway confidence index 234. The prospect recommendation index 236 may include the plurality of prospect data domains 208 mapped with the plurality of product data domains 214 that are associated with the plurality of assessment interpretations 228 with a high confidence score 230. The prospect recommendation index 236 may include a list of products, a list of services, and a list of discount quotations, which may have a high likelihood of being accepted by a prospect (explained in detail by way of subsequent Figs).

In accordance with various embodiments of the present disclosure, the prospect predictor 150 may determine a product concession index 240 based on the prospect profile 222 and the prospect recommendation index 236. The product concession index 240 to include a plurality of concessions 242 associated each of the plurality of product data domains 214 attributed to a prospect from the plurality of prospect data domains 208. The plurality of concessions 242 may be a set of discount quotations generated by the system 110 for processing the prospect assessment requirement 202. In an example, the plurality of concessions 242 may be a set of service term quotations generated by the system 110 for processing the prospect assessment requirement 202. The system 110 may generate optimal product discounts or service terms customized for each prospect based on a past purchase history of the prospect, the product cost, the margin costs, maximum discounts permissible for a particular class of prospects, and the like. In an example, the system 110 may generate multiple discount quotations or multiple service term quotations for a single prospect, wherein, each of the discount quotations or service term quotations may be based on a set of assessment interpretations from the plurality of assessment interpretations 228 present in the decisional pathway 226. For sake of brevity and technical clarity, the embodiments presented hereinafter for the generation of the plurality of concessions 242 should be construed to include generation of a discount percentage and/or service terms customized for each prospect. In accordance with various embodiments of the present disclosure, the prospect predictor 150 may consider for each prospect from the plurality of prospect data domains 208 and for each product from the plurality of product data domains 214 for the generation of the plurality of concessions 242.

In an example, each of the plurality of concessions 242 to be determined by deployment of a unique medium and assigned a confidence value 238 based on the unique medium. The unique medium may be an algorithm, which may be used to determine a concession from the plurality of concessions 242. The confidence value 238 may be a weightage assigned to the algorithm, which may be deployed for determining a concession from the plurality of concessions 242. The system 110 may calculate an average value from all confidence values 238 for generating the product concession index 240. In an example, the system 110 may deploy a Random Forest® method, an XGboost® method and a decision tree method for predicting a discount percent for a particular product. The system 110 may collate predictions from all the deployed algorithms with actual past discount percentages as present in the plurality of historical prospect data and maximum permissible discounts as present in the plurality of product data domains 214. The system 110 may consider each of the algorithms deployed for creating the plurality of concessions 242 as independent models for determining discount percent from each independent model. The system 110 may create a regression model for each of the plurality of concessions 242 created from each independent model.

In an example, each prospect from the plurality of prospect data domains 208 and each product from the plurality of product data domains 214 may be used to derive regressor coefficients to arrive at a sample of coefficients for the algorithm. For the sake of brevity, each prospect from the plurality of prospect data domains 208 and each product from the plurality of product data domains 214 may be referred to as "dataset" hereinafter. The prospect predictor 150 may generate a base predictor for a dataset using various algorithms, for example, a random Forest® method, an XGBoost® method, and a decision Tree® method. The prospect predictor 150 may compare the base predictions generated for a dataset with actual values of discount terms or service terms for that dataset. The prospect predictor 150 may generate a regressor coefficient (also referred to as a "regression model" hereinafter) for a dataset using each of the algorithms deployed. The prospect predictor 150 may collate all the regressor coefficients generated for a particular dataset through various algorithms, for example, a decision tree algorithm, a random forest (RF) algorithm, a Sarimax® algorithm, an XGBoost® algorithm, and the like. The prospect predictor 150 may estimate a population of regressor coefficients' point estimates for each algorithm. In an example, inferential statistics and hypothesis testing based on a sample of regressor coefficients may be deployed for estimating the population of regressor coefficients for each algorithm. The prospect predictor 150 may discard a dataset for sample consideration for each dataset. The prospect predictor 150 may repeatedly draw multiple samples from the dataset by leaving one record (I) out each time, starting from I=1 to N, where N may be the number of observations in the dataset. The system 110 may compute the regression coefficients for all one-observation-left-out-dataset and label them as per the following notation:

| S.no | $\beta_{Reg}$ | $\beta_{RF}$ | $\beta_{SARIMAX}$ | $\beta_{XGBoost}$ | Remarks |
|---|---|---|---|---|---|
| 1 | $\beta_{1,Reg}$ | $\beta_{1,RF}$ | $\beta_{1,SARIMAX}$ | $\beta_{1,XGBoost}$ | Leave 1st observation out |
| 2 | $\beta_{2,Reg}$ | $\beta_{2,RF}$ | $\beta_{2,SARIMAX}$ | $\beta_{2,XGBoost}$ | Leave 2nd observation out |
| ... | ... | ... | ... | ... | ... |
| N | $\beta_{N,Reg}$ | $\beta_{N,RF}$ | $\beta_{N,SARIMAX}$ | $\beta_{N,XGBoost}$ | Leave Nth observation out |

The weights associated with each baseline algorithm ($\hat{W}_{Reg}$, $\hat{W}_{RF}$, $\hat{W}_{SARIMAX}$, $\hat{W}_{XgBoost}$) in the ensemble models may be taken as mid-points of confidence interval estimation for the columns $\beta_{Reg}$, $\beta_{RF}$, $\beta_{SARIMAX}$, $\beta_{XgBoost}$ respectively. The final predictions of the ensemble model-based demand may be calculated using the following expression:

$$Y_{Pred} = (\hat{W}_{Reg} * Y_{Reg}) + (\hat{W}_{RF} * Y_{RF}) + (\hat{W}_{SARIMAX} * Y_{SARIMAX}) + (\hat{W}_{XgBoost} * Y_{XgBoost})$$

wherein, $Y_{Pred}$ may be a final prediction of a discount percentage or a service term for a dataset. In the equation mentioned above, $Y_{Reg}$ may be a prediction using a particular algorithm for a discount percentage for a dataset, $Y_{XgBoost}$ may be a prediction using the XGBoost® algorithm, $Y_{SARIMAX}$ may be a prediction using the Sarimax® algorithm, and $Y_{RF}$ may be a prediction using the random forest (RF) algorithm.

The population point estimates may serve as the final weights associated with base learners in discount calculations or service term calculations. The system 110 may determine the confidence value 238 from the regression model for each of the plurality of concessions 242. The system may determine an average value from all the confidence values 238 assigned to each of the plurality of concessions 242 for arriving at a final discount prediction for a prospect for a particular product.

In operation, the system 110 may be used for generation corporate sales insights for augmenting and facilitating sales force in presenting product recommendations to existing clients with justification for a particular recommendation, developing detailed product price quotations replete with service terms, concessions, marketing promotions, and the like. The system 110 may generate product recommendations keeping view various factors like past purchase history of a prospect, geographical region, size of prospect organization, products purchased by similar prospects, similar products available related to a past product purchase, and the like. The system 110 may cluster various prospects, products and marketing attributes to form related information clusters, which may be used to generate multiple sales insights and facilitate generation of product recommendations to existing/new clients with justification for a particular recommendation, developing detailed product price quotations replete with service terms, concessions, and marketing promotions. The system may receive the prospect assessment requirement 202 from a user of the system 110. The system 110 may deploy the data analyzer 130 to receive prospect data 204 and product data 212 from the plurality of data sources 206. The data analyzer 130 may implement an artificial intelligence component 218 to sort the prospect data 204 into the plurality of prospect data domains 208 and the plurality of prospect historical data domains. The data analyzer 130 may implement the artificial intelligence component 218 to sort the product data 212 into the plurality of product data domains 214. The artificial intelligence component 218 may include artificial intelligence techniques, for example, Natural Language Processing (NLP) model. The plurality of prospect data domains 208, the plurality of prospect historical data domains, and the plurality of product data domains 214 may include data related to various products offered by an organization implementing the system 110, various existing/new prospects, and historical data regarding existing prospects. In an example, the plurality of product data domains 214 may also include data associated with products not offered by an organization implementing the system 110, but which may be similar to the products offered by an organization implementing the system 110. Further, the system 110 may implement the artificial intelligence component 218 to identify the plurality of attributes 216 associated with the prospect assessment requirement 202. In an example, the plurality of attributes 216 may include various measurable $l_{[KSS3]}$parameters, which may be identified by the system 110 to be important from a sales and marketing perspective. For example, the plurality of attributes 216 may include prospect organization class, industry affiliation of the prospect organization, prospect organization size, maximum permissible discounts for a prospect organization class, marketing and trade promotions, and the like.

The prospect analyzer 140 of the system may receive the plurality of prospect data domains 208, the plurality of prospect historical data domains, the plurality of product data domains 214, and the plurality of attributes 216 associated with the prospect assessment requirement 202 from the data analyzer 130. The prospect analyzer 140 may create the prospect matrix 220 by correlating the plurality of prospect data domains 208 with the plurality of product data domains 214. For example, the prospect analyzer 140 may populate details regarding various products relevant to a particular prospect. For example, all products relevant to a technology area from the plurality of product data domains 214 may be mapped against all organizations with similar technology stack from the plurality of prospect data domains 208. In an example, all products relevant to a large-scale organization from the plurality of product data domains 214 may be mapped against all large-scale organizations from the plurality of prospect data domains 208. In an example, the prospect analyzer 140 may populate data regarding various prospects for a particular product. For example, all relevant prospect organizations from the plurality of prospect data domains 208 may be mapped onto a product from the plurality of product data domains 214 based on the relevancy of that product. The system 110 may create a similar mapping for each of the plurality of prospect data domains 208 with each of the plurality of product data domains 214.

The prospect analyzer 140 may determine a prospect profile 222 by correlating the plurality of prospect historical data domains with each of the plurality of product data domains 214 and each of the plurality of attributes 216 associated with the prospect assessment requirement 202. For example, the prospect analyzer 140 may populate details regarding various products relevant for a particular prospect based on past purchases of the product by the particular prospect. For example, the prospect analyzer 140 may map the average deal size for a prospect with all products from the plurality of product data domains 214 with a similar average price. The prospect analyzer 140 may map past products purchased by a prospect with present products available for facilitating upselling and cross-selling operations. The system 110 may create a similar mapping for each of the plurality of historical prospect data with each of the plurality of product data domains 214. In accordance with various embodiments of the present disclosure, the prospect matrix 220 and the prospect profile 222 may be developed by deploying various algorithms, for example, the "describe" function of Pandas® package from Python®.

Further, the prospect analyzer 140 may determine the prospect assessment matrix 224 by correlating the prospect matrix 220 with the plurality of attributes 216. For example, the prospect analyzer 140 may map past marketing and trade promotions leveraged by a prospect for a product for a particular geographical location with respect to present marketing and trade promotions for the same product for the same geographical location. In an example, the prospect analyzer 140 may map the maximum permissible discount for a prospect organization class for a particular product for a particular geographical location with respect to a present value of a maximum permissible discount for the prospect organization class for the same product for the same geographical location. The prospect analyzer 140 may create prospect assessment matrix 224 to include each of the prospects and each of the products to map onto the plurality of attributes 216 as per respective relevance. The prospect assessment matrix 224 may include multiple comparison points, wherein each comparison point may represent an instance in the sales process. The prospect assessment matrix 224 may include information about product purchase likelihood for a prospect, product purchase protentional and the like for a prospect based on past purchase indicators as well current indicators like prospect growth rate, prospect revenue, and the like. The prospect predictor 150 may receive the prospect profile 222, prospect matrix 220, and the prospect assessment matrix 224 from the prospect analyzer 140. Each comparison point from the prospect assessment matrix 224 may be converted to a prospect assessment from the plurality of prospect assessments for generating the decisional pathway 226. In an example, the decisional pathway 226 may be created by deploying a J48 Classification® algorithm with Weka Tool®. The J48 Classification® algorithm may require input in the form of the prospect profile 222 and the prospect assessment matrix 224. The J48 Classification® algorithm may compare the prospect profile 222 and the prospect assessment matrix 224 on basis of previous quotations success rate. The J48 Classification® algorithm may for the decisional pathway 226 on basis of a particular prospect assessment from the plurality of prospect assessments may result in a "won deal" or a "lost deal". The term "won deal" may refer to successful closing of a deal with a prospect for a particular product. The term "lost deal" may refer to the unsuccessful closing of a deal with a prospect for a particular product. The J48 Classification® algorithm may deploy the plurality of attributes 216 prospect data, the plurality of prospect historical data domains, and the plurality of product data domains 214 as independent variables for the algorithm. The comparison of all independent variables may be tested by the algorithm to result in the "won deal" or the "lost deal".

The prospect predictor 150 may assign a confidence score 230 to each of the plurality of prospect assessments. The confidence score 230 may represent the likelihood of a deal being a "won deal" or a "lost deal". A high confidence score 230 may refer to a strong likelihood of the prospect assessment resulting in a "won deal". As mentioned above, the decisional pathway 226 may include a plurality of offshoot decisional pathways 226. The prospect predictor 150 may create the plurality of offshoot decisional pathways 226 by interlinking the each of the plurality of prospect assessments based on the assigned confidence score 230. The prospect predictor 150 may determine the decisional pathway confidence index 234 for each of the plurality of offshoot decisional pathways 226 based on the confidence score 230 assigned to each of the associated plurality of prospect assessments. As mentioned above, the decisional pathway confidence index 234 may include each of the plurality of product data domains 214 mapped with the plurality of assessment interpretations 228 based on the assigned confidence score 230. For example, the decisional pathway confidence index 234 may include a product along with relevant service term and discount for keeping in view each of the prospect data and the plurality of prospect historical data domains, each of the plurality of products data domains, and the plurality of attributes 216. A high level of the decisional pathway confidence index 234 may signify a high likelihood of resulting in a "won deal" for that particular product. For example, the decisional pathway confidence index 234 may provide a cluster of products along with optimal service terms and discount terms based on past performance of the product for various prospects, and current sales and marketing strategy of the organization implementing the system 110.

The prospect predictor 150 may determine the prospect recommendation index 236 from the decisional pathway confidence index 234. The prospect predictor 150 may map each of the prospects from the plurality of prospect domains onto the product cluster generated by the decisional pathway confidence index 234. For example, the prospect recommendation index 236 may provide a recommendation cluster of products (also referred to "recommendations" hereinafter) along with optimal service terms and discount terms, which may have a high likelihood of resulting in a "won deal" for a particular prospect. The prospect predictor 150 may generate the prospect recommendation index 236 for each of the prospects from the plurality of prospect domains, thereby increasing the effectiveness and efficiency of a sales team in responding to a request for quotation for a product.

The prospect predictor 150 may determine the product concession index 240 as mentioned above for increasing the likelihood of the recommendations generated by the prospect recommendation index 236 to result in a "won deal". The system 110 may provide interpretable recommendations from the prospect data based on the detection of co-clusters of a prospect that may purchase bundles of products. The system 110 may include the application of both unsupervised co-clustering of the data in conjunction with supervised classification models. These supervised classification models may be applied to co-cluster level prospect data. The objective of the system 110 may be to map the quotation outcome of a "won deal" or a "lost deal with a prospect and product attributes. The application of unsupervised clustering and decision trees on top of co-clustered data may lead to an understanding of historical purchase patterns associated with similar prospects and their purchase history or likelihood of various prospects for purchasing similar products. The system 110 may gain interpretability of the recommendations provided by comparing individual prospect details with the co-cluster profile in terms of the users of the system and product characteristics.

The embodiments for the prospect assessment requirement 202 presented herein are exemplary in nature and should be treated as such. For the sake of brevity and technical clarity, the description of the prospect recommendation system may be restricted to few exemplary embodiments, however, to a person skilled in the art it should be clear that the system may be used for the fulfillment of various sales insight generations and prospect assessment requirements 202 other than those mentioned hereinafter.

Figure 3:
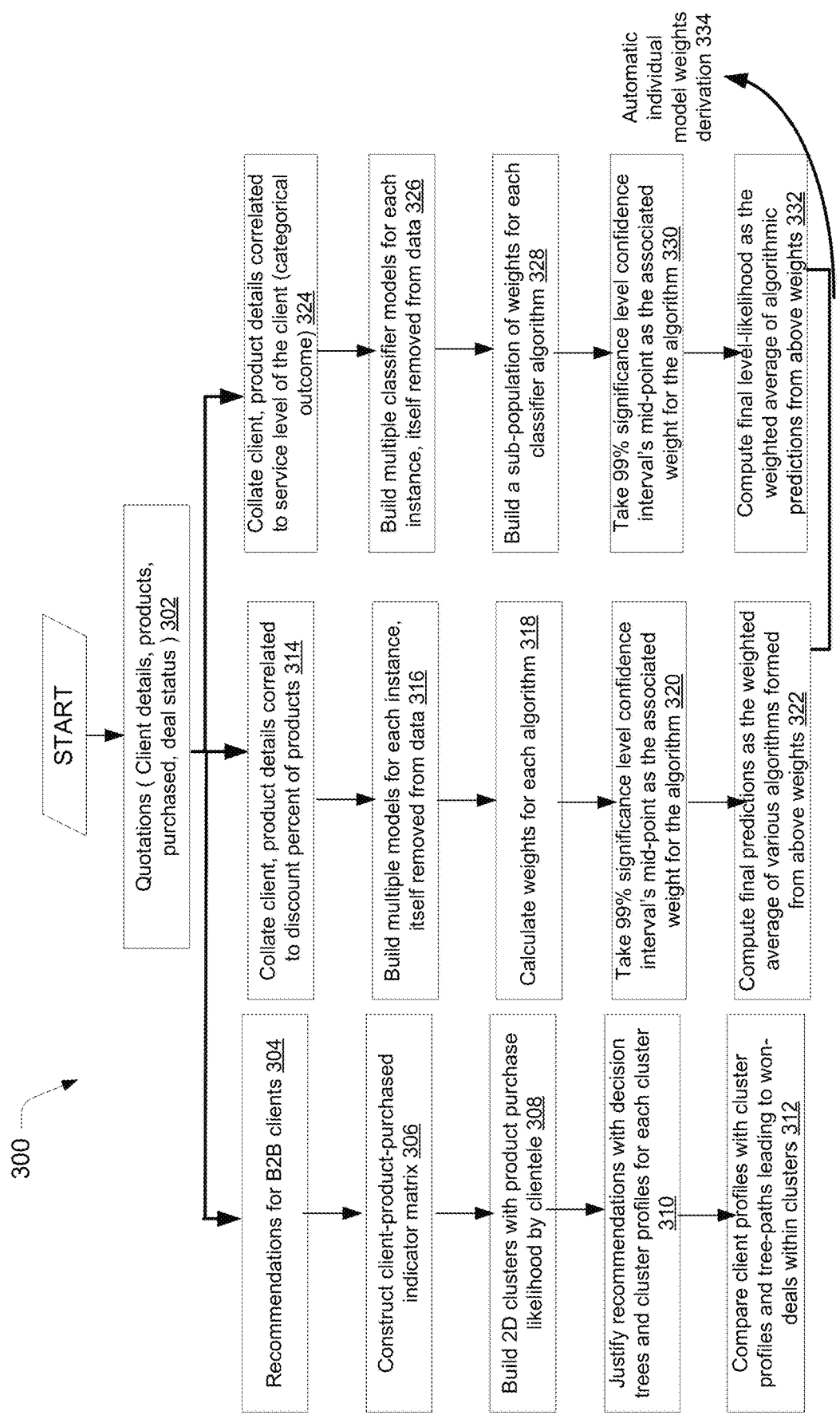
FIG. 3 illustrates a network flow diagram for generating prospect recommendations using a prospect recommendation system, according to an example embodiment of the present disclosure.

FIG. 3 illustrates a network flow diagram 300 for generating prospect recommendations using the prospect recommendation system 110, according to an example embodiment of the present disclosure. Any of the components of the system 110 described above may be deployed for the purpose of the network flow diagram 300. The process 300 may begin with the system 110 receiving a request 302. The request 302 may be to generate a quotation related to a product, a service term, and a discount term for a prospect. In an example, the request 302 may be the prospect assessment requirement 202. The process 300 may process the request 302 according to the content of the request 302. The process 300 may include a product recommendation 304, wherein the request 302 may be related to the generation of a recommendation related to a product. The process 300 may include a collation 314, wherein the request 302 may be related to the recommendation for a discount for a product category for an opportunity or a particular quote. |[KSS4]The process 300 may include a collation 324, wherein the request 302 may be related to the recommendation for a service term for a product category for an opportunity or a particular client.

In accordance with various embodiments of the present disclosure, the product recommendation 304 may include a construction 306. The construction 306 may construct a client-products purchased indicator matrix. In an example, the construction 306 may be the prospect profile 222 generated by the prospect analyzer 140. The product recommendation 304 may further include a cluster 308. The cluster 308 may be a two-dimensional cluster with product purchase likelihood by a particular client. The system 110 may generate multiple clusters 308. In an example, the cluster 308 may be a part of the prospect assessment matrix 224. The cluster 308 may provide product recommendations for a particular client. The process 300 may further include a justification 310. The justification 310 may justify the product recommendations by generating a decision tree for each of the clusters 308. In an example, the justification 310 may be the decisional pathway 226 determined by the prospect predictor 150. The process 300 may further include a comparison 312. The comparison 312 may compare profiles for various clients with the clusters 308 and the decision tree from the justification 310. The comparison 312 may focus on the decision trees from the justification 310 that lead to a "won deal". In an example, the comparison 312 may deploy the decisional pathway confidence index 234, and the prospect recommendation index 236 for comparing the clusters 308 and decision trees from the justification 310.

The process 300 may include a collation 314, wherein the request 302 may be related to generation a quotation related to a discount for a product for a particular client. The collation 314 may include collating client details and the product details related to a discount percent of a product. In an example, the collation 314 may collate client details from the plurality of prospect data domains 208 and the plurality of prospect historical data domains. The collation 314 may collate product details related to a discount percent from the plurality of product data domains 214. The process 300 may further include a model building 316. The model building 316 may determine multiple discount percent models, wherein each model may deploy a different algorithm. The model building 316 may be followed by a calculation 318. The calculation 318 may determine the individual weightage of each discount percent model based on the algorithm deployed. The process 300 may further include a selection 320. The selection 320 may select a 99% significance level confidence interval's mid-point as the associated weight for the algorithm. In an example, the associated weight for the algorithm may be the confidence value 238 assigned to each of the plurality of concessions 242 based on algorithm deployed. The process 300 may further include a computation 322. The computation 322 may include computing final predictions as the weighted average of various algorithms formed from the above weights.

The process 300 may include a collation 324, wherein the request 302 may be related to generation a quotation related to a service term for a product for a particular client. The collation 324 may include collating client details and the product details related to the service-level of a client. In an example, the collation 324 may collate client details from the plurality of prospect data domains 208 and the plurality of prospect historical data domains. The collation 324 may collate product details related to a service-level of a client from the plurality of product data domains 214. The process 300 may further include a model building 326. The model building 326 may determine multiple service classification models, wherein each model may deploy a different algorithm. The model building 326 may be followed by a calculation 328. The calculation 328 may determine the individual weightage of each service class model based on the algorithm deployed. The process 300 may further include a selection 330. The selection 330 may select a 99% significance level confidence interval's mid-point as the associated weight for the algorithm. The process 300 may further include a computation 332. The computation 332 may include computing final predictions as the weighted average of various algorithms formed from the above weights. The computation 322 and the computation 332 may lead to an automatic individual model for weights derivation 334.

Figure 4:
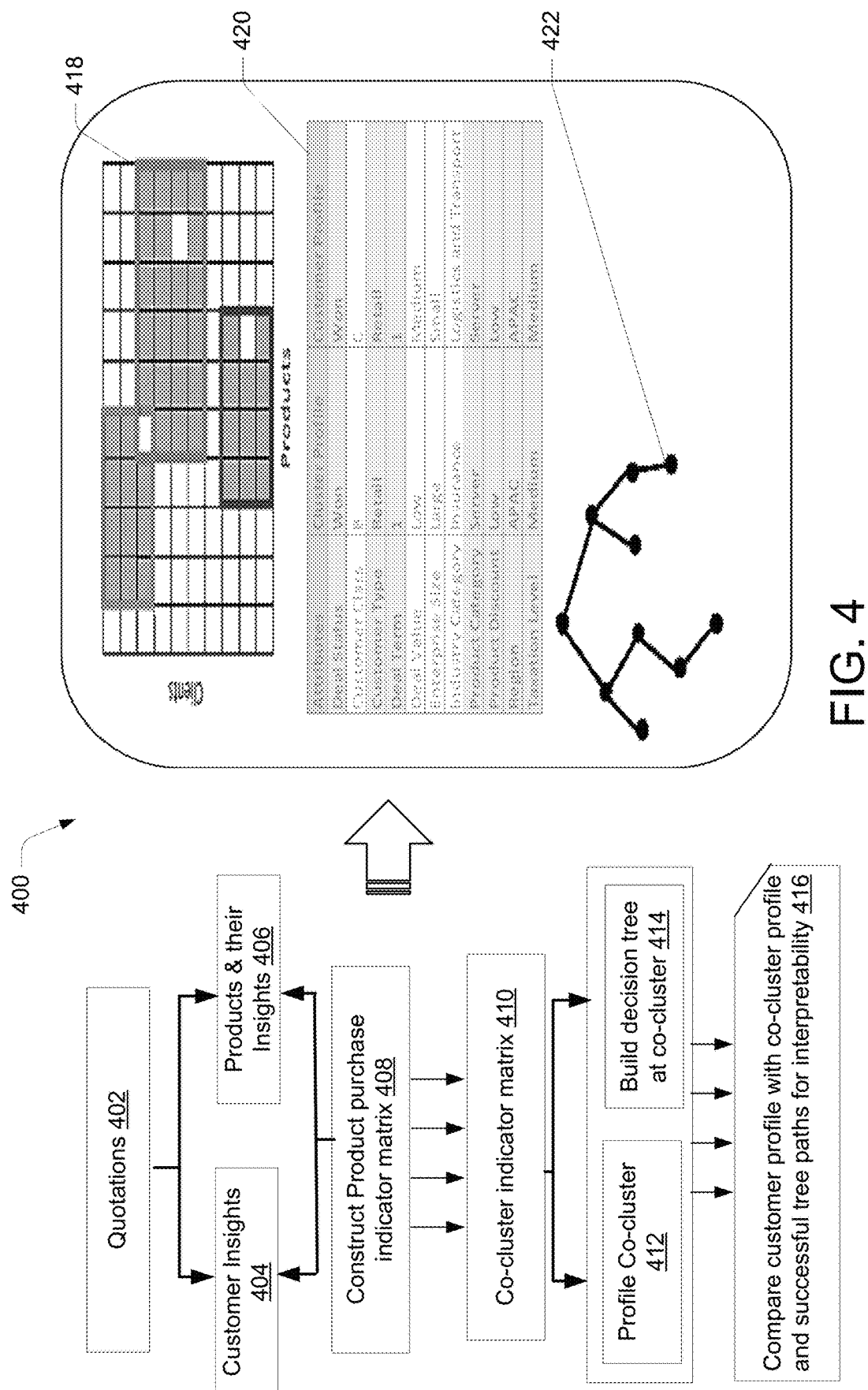
FIG. 4 illustrates a flow diagram for clustering prospects and products using a prospect recommendation system, according to an example embodiment of the present disclosure.

FIG. 4 illustrates a flow diagram 400 for clustering prospects and products using the prospect recommendation system 110, according to an example embodiment of the present disclosure. Any of the components of the system 110 described above may be deployed for the purpose of the flow diagram 400. The process 400 may begin with the system 110 receiving a request 402. The request 402 may be to generate a quotation related to a product for a prospect. In an example, the request 402 may be the prospect assessment requirement 202. The request 402 may include constructing a client-products purchased indicator matrix 408 represented by a pictorial representation 418. The process 400 may perform the construction of the client-products purchased indicator matrix 408 as mentioned above by way of FIG. 2. The client-products purchased indicator matrix 408 may be based on receiving inputs from a consumer insight component 404 and a product insight component 406. In an example, the consumer insight component 404 may be the plurality of prospect data domains 208 and the plurality of historical prospect data derived from the prospect data 204. In an example, the product insight component 406 may be the plurality of product data domains 214 derived from the product data 212. The process 400 may further include generating a co-cluster indicator matrix 410 based on the client-products purchased indicator matrix 410. In an example, the client-products purchased indicator matrix 408 may be the prospect profile 222. In an example, the co-cluster indicator matrix 410 may be the prospect matrix 220. The process 400 may further include a profile co-cluster 412 represented by a pictorial representation 420. In an example, the profile co-cluster 412 may be the prospect assessment matrix 224. The process 400 further includes a decision tree co-cluster 414 represented by a pictorial representation 422.

In an example, the decision tree co-cluster 414 may be the decisional pathway 226. As mentioned, by way of FIG. 2 the prospect profile 222 and the prospect assessment matrix 224 may be mapped together for creating the decisional pathway 226. The process 400 further includes a comparison 416. The comparison 416 may include comparing the profile co-cluster 412 and the decision tree co-cluster 414 for generating product recommendations in response to the request 402. As also mentioned by way of FIG. 2, the process 400 may generate product recommendations based on the decision tree co-cluster 414 with a high confidence score 230 and a high decisional pathway confidence index 234 so that the generated product recommendations have a high likelihood to result in a "won deal".

Figure 5A:
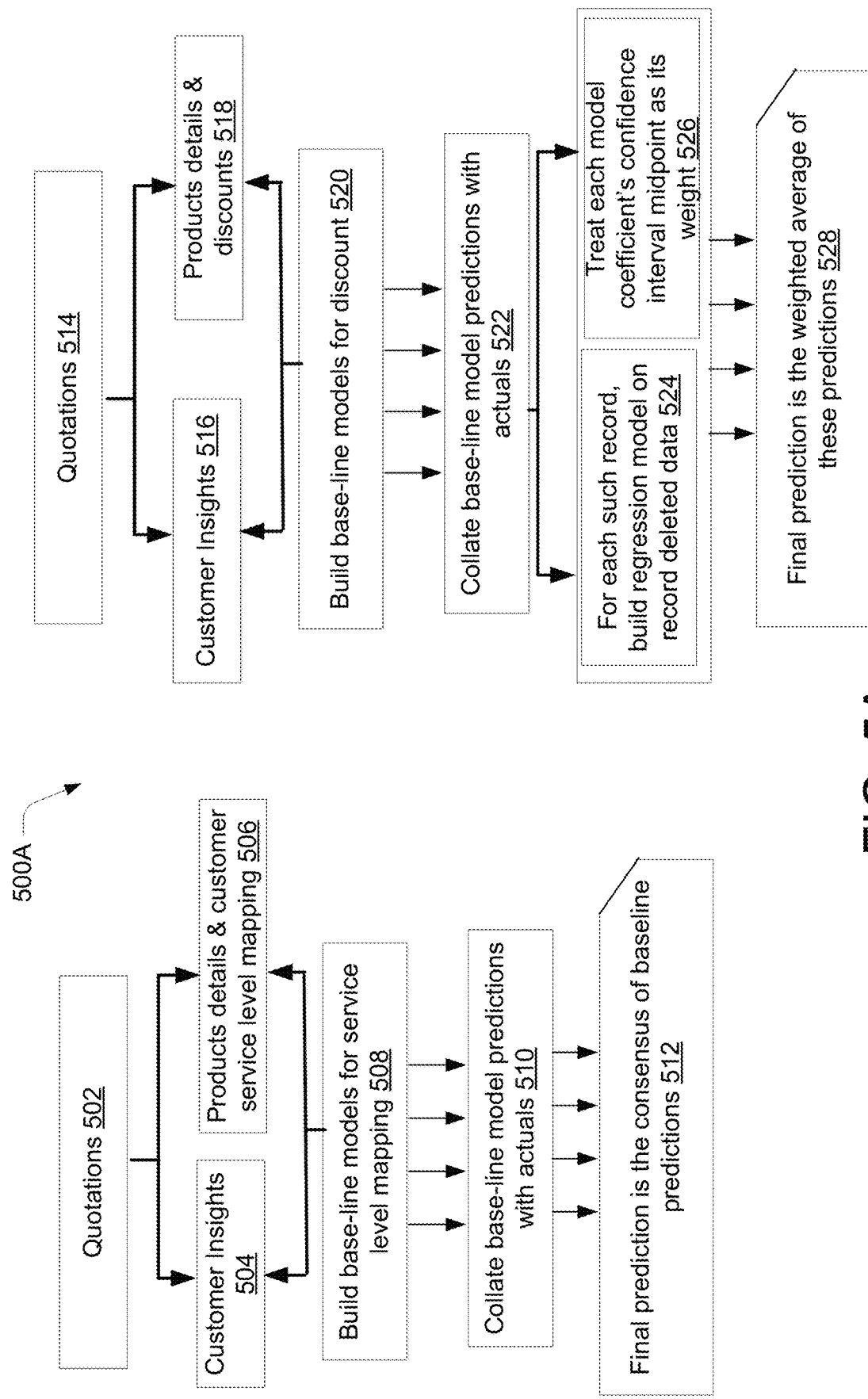
FIG. 5A illustrates a flow diagram for customer service-level mapping and discount derivation for a prospect using a prospect recommendation system, according to an example embodiment of the present disclosure.

FIG. 5A illustrates a flow diagram 500A for customer service-level mapping and discount derivation for a prospect using the prospect recommendation system 110, according to an example embodiment of the present disclosure. Any of the components of the system 110 described above by way of FIG. 1, FIG. 2, FIG. 3, and FIG. 4 may be deployed for the purpose of the flow diagram 500A and the pictorial representation 500B.

The flow diagram 500A may include a request 502, wherein the request 502 may be related to generation a quotation related to a service term for a product for a particular client. The request 502 may include collating client details and the product details related to the service-level of a client. In an example, the request 502 may collate client details from a customer insight component 504. In an example, customer insight component 504 may be the plurality of prospect data domains 208 and the plurality of prospect historical data domains. The request 502 may collate product details related to a service-level of a client from a products details & customer service-level mapping component 506. In an example, the products details & customer service-level mapping component 506 may include data related to various service level classes mapped to various products offered by an organization. The products details & customer service-level mapping component 506 may include, for example, three service level agreements, namely a first service level agreement, a second service level agreement, and a third service level agreement. The request 502 may include collating client details and the product details related to one of the first service level agreements, the second service level agreement, and the third service level agreement as mentioned above. In an example, the products details & customer service-level mapping component 506 may be the plurality of product data domains 214. The system 110 may process the request 502 by executing a model building 508 as illustrated by the flow diagram 500A. The model building 508 may determine multiple service classification models, by the deployment of different algorithms. In an example, the algorithms deployed may be a random forest algorithm, an MLR algorithm, and a decision tree algorithm (described below in detail).

The model building 508 may be followed by a collation 510. The collation 510 may collate the multiple service classification models created by model building 508 and compare the multiple service classification models with actual past service-level modes as present in the products details & customer service-level mapping component 506 and the customer insights component 504. The flow diagram 500A may further include a computation 512. The computation 512 may include computing final predictions as the weighted average of various algorithms formed from the above weights.

In accordance with various embodiments of the present disclosure, the system 110 may deploy an ensemble method for service term mapping for a product for a particular client. In an example, the system may deploy an adaptive ensemble technique for service term mapping. The ensemble methods may be meta-algorithms that may combine several machine learning techniques into one predictive model in order to decrease variance, bias, and improve predictions. The ensemble methods may aggregate the decisions of diverse component classifiers to achieve superior classification performances. The system 110 may deploy a framework for the dependent weighting of various algorithms instead of fixed weights. The algorithm weighing functions may be linked to the ability of the respective algorithm to correctly predict the service class. In an example, the design mechanism may be automated and totally data-driven. For example, the model building 508 may build a random forest model, an XGBoost model, and a decision tree-based model. The model building 508 may divide the data received by the request 502 from the customer insight component 504 and the product details & customer service-level mapping component 506 into 'k-folds' to be subjected to classification models like the random forest model, an XGBoost model, and a decision tree-based model. Each of the classification models may predict one of the first service level agreement, the second service level agreement, and the third service level agreement to be associated with the request 502. The model building 508 may provide a prediction accuracy value for a 'fold' level for every prediction made by every classification model. The system 110 may deploy the model building 508 for generating a service level prediction for each of the prospects from the plurality of prospect data domains 208 using multiple algorithms, a few examples of which are mentioned above. For example, a prospect from the plurality of prospect data domains 208 would have a prediction accuracy value assigned with respect to each of the first service level agreement, the second service level agreement, and the third service level agreement and also with respect to each of the classification models like the random forest model, an XGBoost model, and a decision tree-based model. Therefore, each prospect from the plurality of prospect data domains 208 would have nine prediction accuracy values assigned to it.

The collation 510 may collate the prediction accuracy value at the fold level by calculating an average prediction accuracy for each classification model with due consideration to fold level quality metrics. The collation 510 may collate a prediction accuracy value at the fold level for each of the models deployed by the model building 508 for each of the prospects from the plurality of prospect data domains 208. For example, the collation 510 may calculate an average prediction value for each of the classification models with respect to the first service level agreement, the second service level agreement, and the third service level agreement.

The computation 512 may compute final predictions as the weighted average formed from the prediction accuracy value for each of the algorithms deployed by the model building 508. The algorithm weighing functions may be linked to the ability of the respective algorithms to correctly predict the service level classes from the first service level agreement, the second service level agreement, and the third service level agreement for various products. The algorithms, which may exhibit a better performance measure across the k-fold may have a higher weightage assigned to them by the flow diagram 500A. The computation 512 may leverage the weighted average likelihood to map a prospect from the plurality of prospect data domains 208 to a service level class from the products details & customer service-level mapping component 506. In an example, the service level class may be one of the first service level agreement, the second service level agreement, and the third service level agreement.

In an example, the computation 512 may select a 99% significance level confidence interval's mid-point as the associated weight for the algorithm. In an example, the associated weight for the algorithm may be the confidence value 238 assigned to each of the plurality of concessions 242 based on algorithm deployed. The system 110 may determine an average value from all the confidence values 238 assigned to each of the plurality of concessions 242 for arriving at a final service term prediction for a prospect for a particular product. In accordance with various embodiments of the present disclosure, the system 110 may deploy any of the components of the data analyzer 130, the prospect analyzer 140 and the prospect predictor 150 for the purpose of the flow diagram 500A.

The flow diagram 500A may include a request 514, wherein the request 514 may be related to generation a quotation related to a discount for a product for a particular client. The request 514 may include collating details regarding a client from a consumer insight component 516. In an example, the consumer insight component 516 may be the plurality of prospect data domains 208 and the plurality of historical prospect data derived from the prospect data 204. The request 514 may include collating details related to a discount percent of a product from a product details and discounts component 518. In an example, the product details and discounts component 518 may be the plurality of product data domains 214 derived from the product data 212. The flow diagram 500A may further include a model building 520. The model building 520 may determine multiple discount percent models, wherein each model may deploy a different algorithm. In accordance with various embodiments of the present disclosure, the system 110 may deploy an ensemble method for discount calculation for a product for a particular client. In an example, the system may deploy an adaptive ensemble technique for discount calculation. The ensemble methods may be meta-algorithms that may combine several machine learning techniques into one predictive model in order to decrease variance, bias, and improve predictions. The ensemble methods may aggregate the decisions of diverse algorithms to achieve superior classification performances. The system 110 may deploy a framework for the dependent weighting of various algorithms instead of fixed weights. The algorithm weighing functions may be linked to the ability of the respective algorithm to correctly predict the service class. In an example, the design mechanism may be automated and totally data-driven. For example, the model building 520 may build a random forest model, an XGBoost model, and a decision tree-based model. The model building 520 may divide the data received by the request 514 from the consumer insight component 516 and the product details and discounts component 518 into 'k-folds' to be subjected to classification models like the random forest model, an XGBoost model, and a decision tree-based model. The system 110 may deploy the model building 520 for generating a discount percentage prediction for each of the prospects from the plurality of prospect data domains 208 using multiple algorithms, some of which are described above.

The model building 520 may be followed by a collation 518. The collation 518 may collate the multiple discount percent models created by model building 520 and compare the multiple discount percent models with actual past discount percentages as present in the product details and discounts component 518 and the customer insights component 516. The flow diagram 500A may deploy multiple algorithms for building each of the multiple discount percent models. The flow diagram 500A may consider each of the algorithms deployed for creating each of the discount percent models as independent models and create a regression model 524 for each of the discount percent models created from each independent model. The flow diagram 500A may determine the individual weightage of each discount percent model based on the algorithm deployed. The flow diagram 500A may further include a selection 526. The selection 526 may select a 99% significance level confidence interval's mid-point as the associated weight for the algorithm. In an example, the associated weight for the algorithm may be the confidence value 238 assigned to each of the plurality of concessions 242 based on algorithm deployed. The flow diagram 500A may further include a computation 528. The computation 528 may include computing final predictions as the weighted average of various algorithms formed from the above weights. The system may determine an average value from all the confidence values 238 assigned to each of the plurality of concessions 242 for arriving at a final discount prediction for a prospect for a particular product. As mentioned above, by way of FIG. 2 the system 110 may determine the confidence value 238 from the regression model 524 for each of the plurality of concessions 242. The system 110 may determine an average value from all the confidence values 238 assigned to each of the plurality of concessions 242 for arriving at a final discount prediction for a prospect for a particular product. In accordance with various embodiments of the present disclosure, the system 110 may deploy any of the components of the data analyzer 130, the prospect analyzer 140 and the prospect predictor 150 for the purpose of the flow diagram 500A.

Figure 5B:
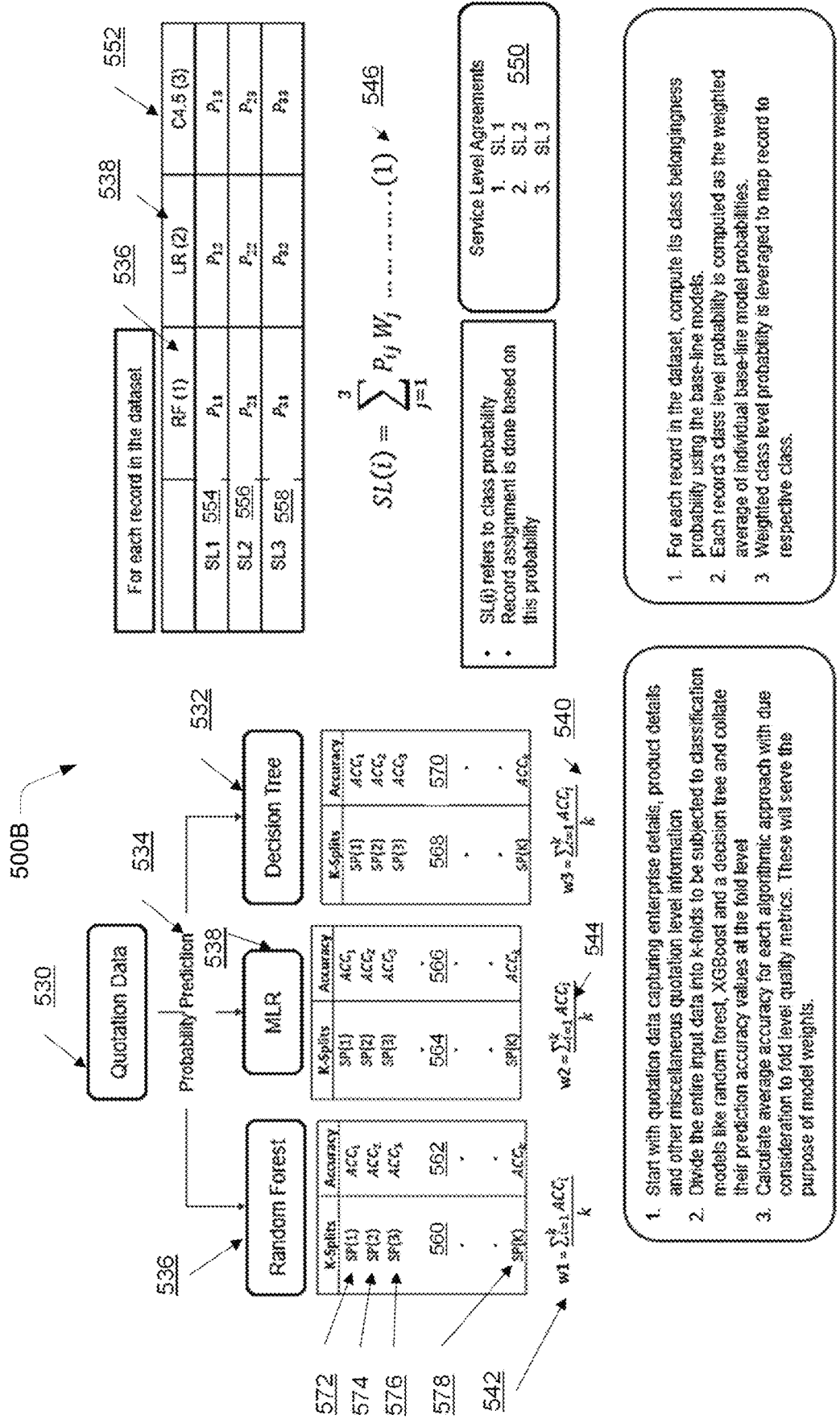
FIG. 5B illustrates a pictorial representation for customer service-level mapping for a prospect using a prospect recommendation system, according to an example embodiment of the present disclosure.

FIG. 5B illustrates a pictorial representation 500B for customer service-level mapping for a prospect using the prospect recommendation system 110, according to an example embodiment of the present disclosure. In the pictorial representation 500B, the system 110 may be deployed to process a quotation data 530. The quotation data may include organizational details, prospect details, product details and other details associated with processing the prospect assessment requirement 202. The quotation data 530 may be collating client details and the product details related to a service-level of a client. In an example, the quotation data 530 may include client details from the customer insight component 504. The quotation data 530 may include product details related to a service-level of a client from the product details & customer service-level mapping component 506. In an example, the quotation data 530 may include data related to various service level classes mapped to various products offered by an organization. The service level classes may be, for example, a first service level agreement 554, a second service level agreement 556, and a third service level agreement 558. The system 110 may generate a service level prediction 550 from amongst the first service level agreement 554, the second service level agreement 556, and the third service level agreement 558 for all prospects and for each record in the quotation data 530. Therefore, the system 110 may determine a likelihood for each of the first service level agreement 554, the second service level agreement 556, and the third service level agreement 558 for each record in the quotation data 530. As also, mentioned above for the system 110 may deploy various algorithms like a random forest algorithm 536, an MLR algorithm 538, and a decision tree algorithm 532 for building prediction models for the service level prediction 550. In an example, the decision tree algorithm 532 may be a C4.5 algorithm 552. The system 110 may deploy any other algorithm not mentioned herein for determining the service level prediction 550.

In accordance with various embodiments of the present disclosure, the system 110 may classify the quotation data 530 into various segment sets also referred to as "k-splits". The system 110 may determine a set of k-splits for each of the algorithm deployed for the model building 508. For example, the system may determine a set of k-splits 560 for the random forest algorithm 536, a set of k-splits 564 for the MLR algorithm 538, a set of k-splits 568 for the decision tree algorithm 532. The system 110 may generate various segments from each of the sets of k-splits 560, set of k-splits 564, and the set of k-splits 568. For example, an SP (1) segment 572, an SP (2) segment 574, an SP (3) segment 576, an SP (k) segment 578, and the like may be generated for the set of k-splits 560. The system 110 may deploy the model building 508 (details mentioned above) to generate the service level prediction 550 for the quotation data 530 classified into the SP (1) segment 572 by considering the quotation data 530 classified into the SP (2) segment 574, the SP (3) segment 576, and so on until the SP (k) segment 578. The system 110 may determine a prediction accuracy depicted by $ACC_1$ in the pictorial representation 500B for the service level prediction 550 generated for the quotation data 530 classified into the SP (1) segment 572. The system 110 may deploy the model building 508 (details mentioned above) to generate the service level prediction 550 for the quotation data 530 classified into the SP (2) segment 574 by considering the quotation data 530 classified into the SP (1) segment 572, the SP (3) segment 576, and so on until the SP (k) segment 578. The system 110 may determine a prediction accuracy depicted by $ACC_2$ in the pictorial representation 500B for the service level prediction 550 generated for the quotation data 530 classified into the SP (2) segment 574. The system 110 may deploy the model building 508 (details mentioned above) to generate the service level prediction 550 for the quotation data 530 classified into the SP (3) segment 576 by considering the quotation data 530 classified into the SP (2) segment 574, the SP (1) segment 572, and so on until the SP (k) segment 578. The system 110 may determine a prediction accuracy depicted by $ACC_3$ in the pictorial representation 500B for the service level prediction 550 generated for the quotation data 530 classified into the SP (3) segment 576. The system 110 may deploy the model building 508 (details mentioned above) to generate the service level prediction 550 for the quotation data 530 classified into the SP (k) segment 578 by considering the quotation data 530 classified into all other segments except the SP (k) segment 578. For example, the system 110 may build a prediction model for predicting the service class level (mentioned above) for the service level prediction 550 using the quotation data 530 classified into the SP (1) segment 572, and the SP (3) segment 576 and validate the prediction model against the quotation data 530 classified into the SP (k) segment 578. The system 110 may determine a prediction accuracy depicted by $ACC_k$ in the pictorial representation 500B for the service level prediction 550 generated for the quotation data 530 classified into the SP (k) segment 578. The system 110 may calculate an average prediction accuracy from the accuracy $ACC_1$, $ACC_2$, $ACC_3$, and $ACC_k$ for each set of the k-splits. In the pictorial representation 500B, the set of k-splits 560 may have an average prediction accuracy 562, the set of k-splits 564 may have an average prediction accuracy 566, and set of k-splits 568 may have an average prediction accuracy 570. In accordance with various embodiments of the present disclosure, the system 110 may use an equation 542 to calculate the average accuracy 562. The equation 542 may be:

$$w1 = \frac{\sum_{i=1}^{k} ACC_i}{k},$$

wherein w1 may the average prediction accuracy 562 for the random forest algorithm 536, "i" may be a numerical value corresponding to the number of set of splits as mentioned above, "k" may be a total number of splits for example, "k" would be equal to "4" for the SP (1) segment 572, the SP (2) segment 574, the SP (3) segment 576, and the SP (k) segment 578 generated by the system 110 for the quotation data 530. The system 110 may deploy an equation 544 to calculate the average prediction accuracy 566. The equation 542 may be:

$$w2 = \frac{\sum_{i=1}^{k} ACC_i}{k},$$

wherein w2 may the average prediction accuracy 566 for the MLR algorithm 538 and the rest of the elements may be the same as the equation 542. The system 110 may deploy an equation 540 to calculate the average prediction accuracy 570. The equation 542 may be:

$$w3 = \frac{\sum_{i=1}^{k} ACC_i}{k},$$

wherein w3 may the average prediction accuracy 570 for the decision tree algorithm 532 and the rest of the elements may be the same as the equation 542. Therefore, the system 110 may determine an average prediction accuracy for each algorithm deployed to generate the service level prediction 550.

Additionally, the service level prediction 550 may include likelihood of each of the first service level agreement 554, the second service level agreement 556, and the third service level agreement 558 that may be appropriate for a record from the quotation data 530 by deploying each of the random forest algorithm 536, the MLR algorithm 538, and the decision tree algorithm 532 (like the C4.5 algorithm 552). Therefore, each record from the quotation data 530 would have nine (9) likelihood values pertaining to different algorithms used for the prediction model building and different service class levels. For example, as illustrated in the pictorial representation 500B, a symbol $P_{11}$ may represent likelihood associated with the first service level agreement 554 for a record from the quotation data 530 using the random forest algorithm 536. A symbol $P_{21}$ may represent likelihood associated with the second service level agreement 556 for the record from the quotation data 530 using the random forest algorithm 536. A symbol $P_{31}$ may represent likelihood associated with the third service level agreement 558 for the record from the quotation data 530 using the random forest algorithm 536. A symbol $P_{12}$ may represent likelihood associated with the first service level agreement 554 for the record from the quotation data 530 using the MLR algorithm 538. A symbol $P_{22}$ may represent likelihood associated with the second service level agreement 556 for the record from the quotation data 530 using the MLR algorithm 538. A symbol $P_{32}$ may represent likelihood associated with the third service level agreement 558 for the record from the quotation data 530 using the MLR algorithm 538. A symbol $P_{13}$ may represent likelihood associated with the first service level agreement 554 for the record from the quotation data 530 using the C4.5 algorithm 552. A symbol $P_{23}$ may represent likelihood associated with the second service level agreement 556 for the record from the quotation data 530 using the C4.5 Algorithm 552. A symbol $P_{33}$ may represent likelihood associated with the third service level agreement 558 for the record from the quotation data 530 using the C4.5 algorithm 552. The system 110 may deploy an equation 546 to calculate a weighted average of the likelihood values mentioned above. The equation 546 may be:

$$SL(i)=\Sigma_{j=1}^{3}P_{ij}W_{j} \quad (1),$$

wherein "SL (i) may refer to a likelihood for a service level class from the first service level agreement 554, the second service level agreement 556, and the third service level agreement 558, "j" may refer to a numerical value corresponding to number of algorithms deployed by the system 110 for determination of the service class prediction 550. The likelihood for a service level class may have a value between 0 and 1. In the equation 546 the term "$P_{ij}$" may refer to the likelihood values pertaining to different algorithms used for the prediction model building and different service class levels described above by way of the symbols "$P_{11}$", "$P_{12}$", "$P_{13}$", "$P_{21}$", "$P_{22}$", "$P_{23}$", "$P_{31}$", "$P_{32}$", and "$P_{33}$". In the equation 546, the term "$W_j$" may refer to the average prediction accuracy determined as described above for each of the algorithms deployed for the service class prediction 550. The average prediction accuracy may be the average prediction accuracy 562, the average prediction accuracy 566, and the average prediction accuracy 570. The equation 546 may provide a final likelihood value for each of the first service level agreement 554, the second service level agreement 556, and the third service level agreement 558 with respect to each record from the quotation data 530, thereby determining a total of three likelihood values for each record from the quotation data 530. The system 110 may determine a likelihood value that may be highest amongst the three likelihood values for a record from the quotation data 53 and map the same against that record from the quotation data 530. Therefore, the system 110 may leverage a weighted class level likelihood for predicting service level for a prospect by deploying the system 110.

Figure 6:
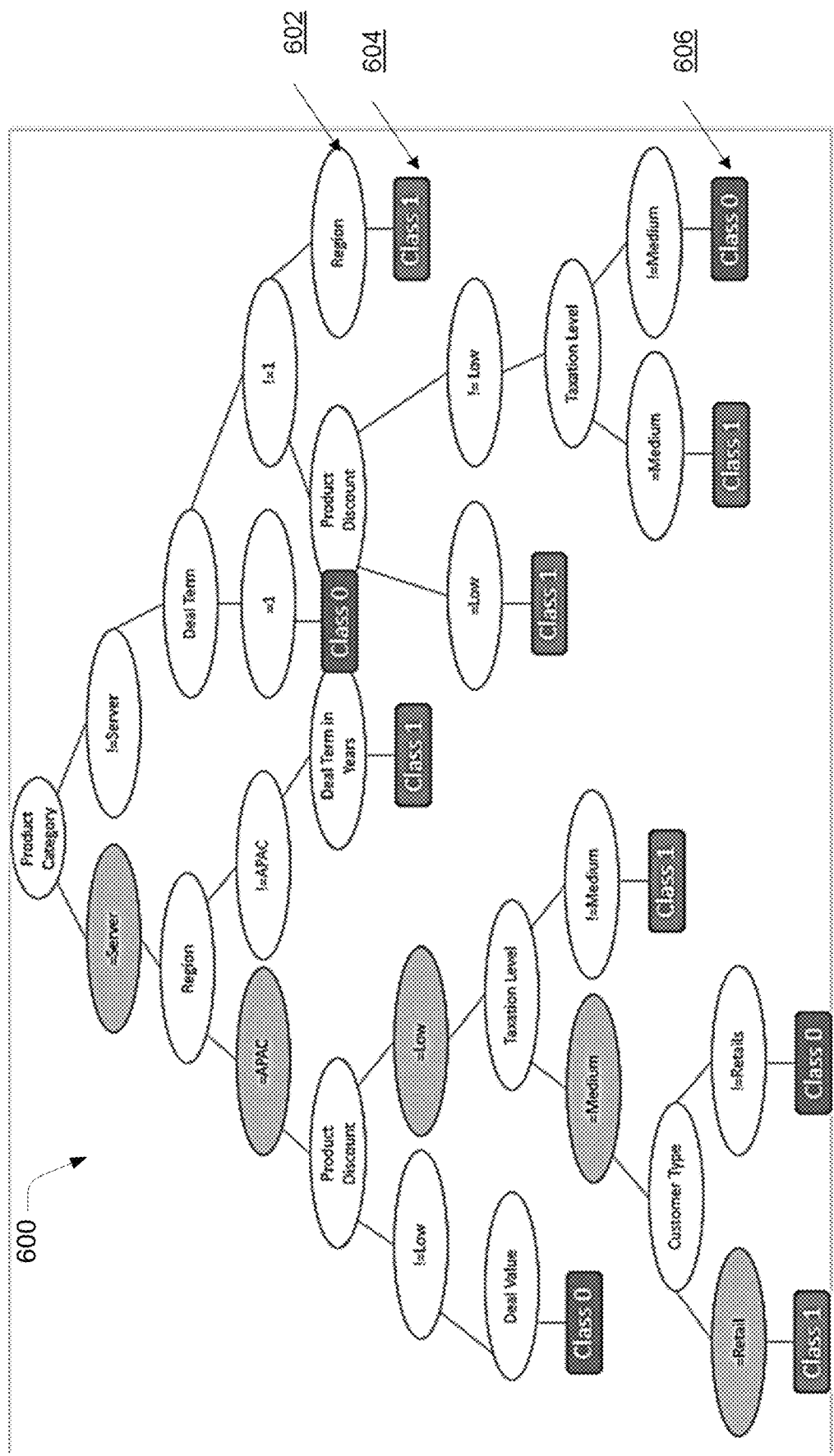
FIG. 6 illustrates a pictorial representation of a decisional pathway created for prospect recommendation generation by a prospect recommendation system, according to an example embodiment of the present disclosure.

FIG. 6 illustrates a pictorial representation of a decisional pathway 600 created for prospect recommendation generation by the prospect recommendation system, according to an example embodiment of the present disclosure. Any of the components of the system 110 described above may be deployed for the purpose of the pictorial representation 600.

The prospect predictor 150 may determine the decisional pathway 600 based on a comparison between the prospect profile 222 and the prospect assessment matrix 224. The decisional pathway 226 may include a plurality of assessment interpretations 602. The prospect predictor 150 may assign a confidence score 604 to each of the plurality of assessment interpretations 228 to determine the decisional pathway confidence index 234. The decisional pathway confidence index 234 may include each of the plurality of product data domains 214 mapped with the plurality of assessment interpretations 228 based on the confidence score 230 assigned to each of the plurality of assessment interpretations 228. The decisional pathway 600 may same the decisional pathway 226. For sake of brevity and technical clarity, the detailed explanation of the decisional pathway 600 is not provided here and the decisional pathway 600 should be treated as similar to the decisional pathway 226.

Figure 7A:
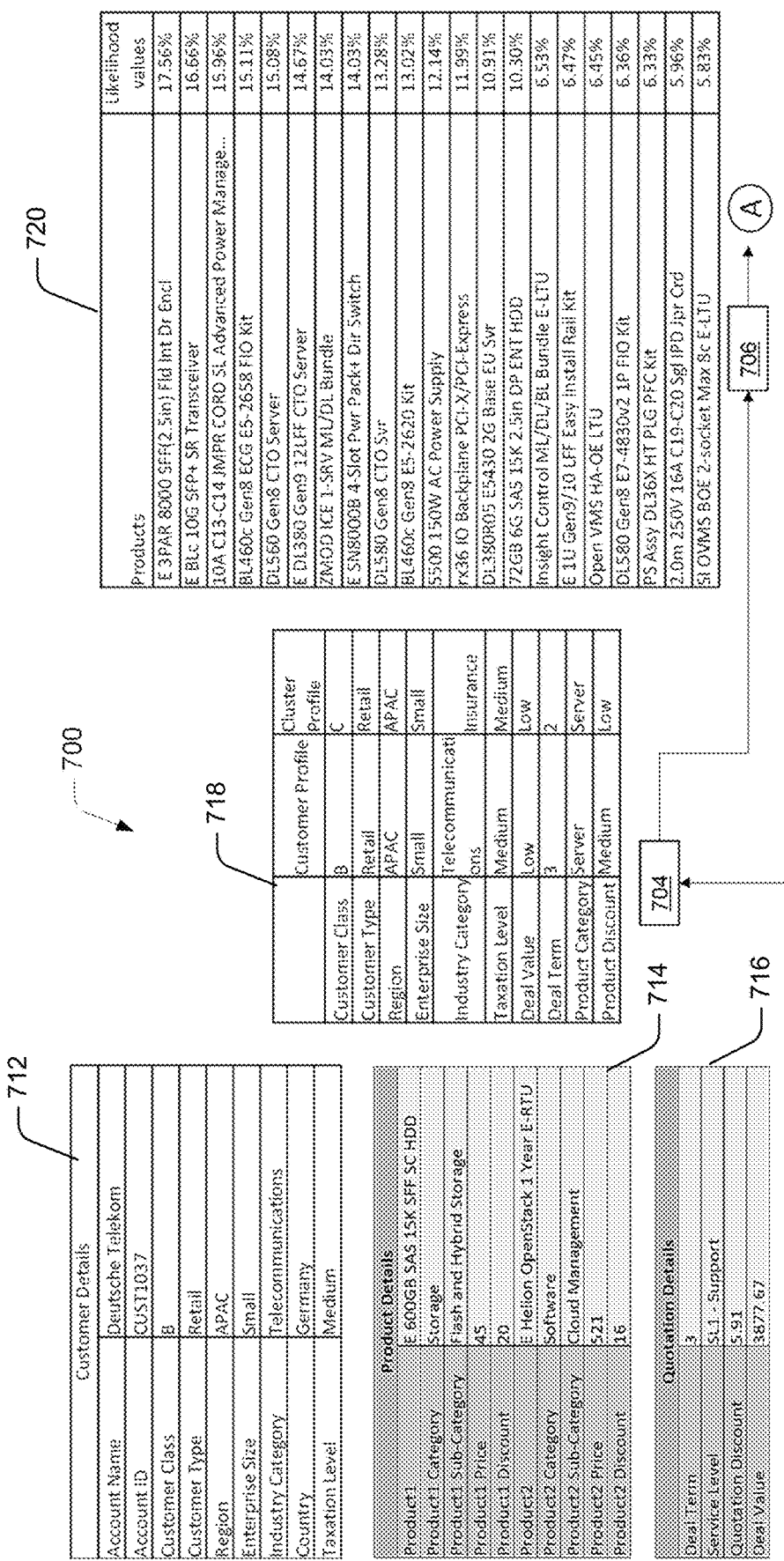
FIGS. 7A and 7B illustrate a process for deployment of a prospect recommendation system for prospect recommendation generation, according to an example embodiment of the present disclosure.
Figure 7B:
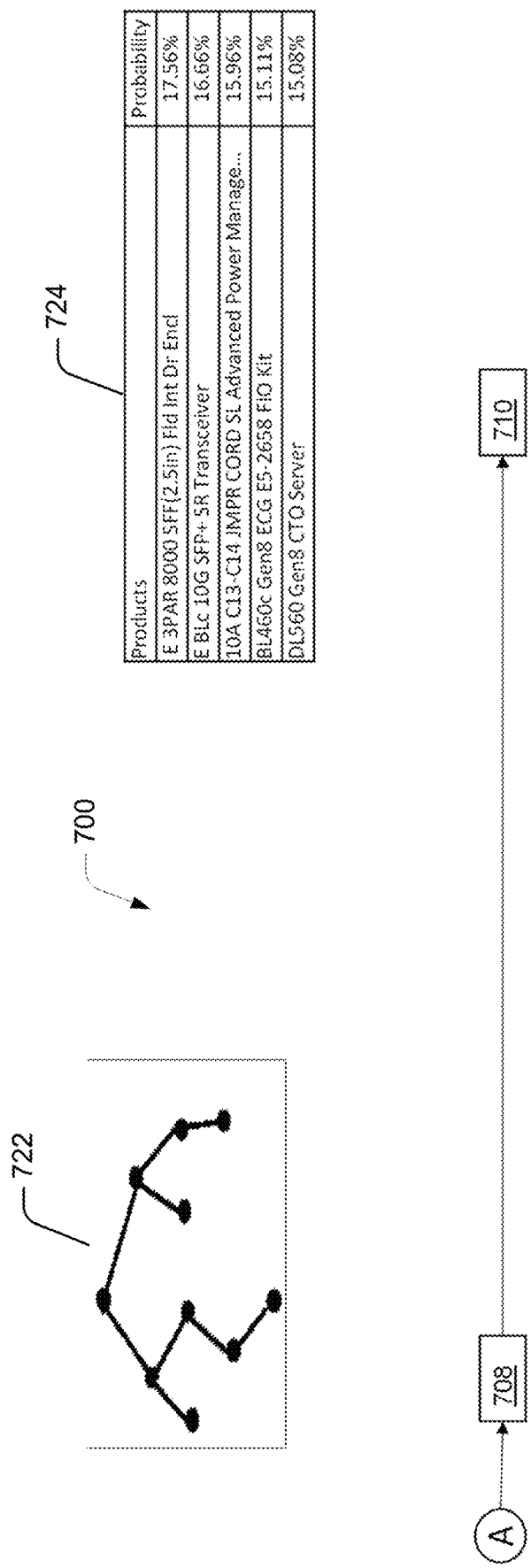

FIGS. 7A and 7B illustrate a process 700 for the deployment of the prospect recommendation system 110 for prospect recommendation generation, according to an example embodiment of the present disclosure. Any of the components of the system 110 described above may be deployed for the purpose of the process 700. The process 700 may include a step 702. The step 702 may include the creation of a customer details matrix 712, a product details matrix 714, and a quotation detail matrix 716. In an example, the customer details matrix 712 may be a part of the plurality of prospect data domains 208. The product details matrix 714 may be a part of the plurality of product data domains 214. The quotation detail matrix 716 may be the prospect assessment requirement 202. The step 702 may be followed by the step 704. The process 700 may include creation of a customer—product matrix 718 at the step 704. In an example, the customer—product matrix 718 may be the prospect matrix 220. The process 700 may further include a step 706 for generation of a two-dimensional matrix 720 including a likelihood value 232 for each of the products by a particular client. In an example, the two-dimensional matrix 720 may be the prospect assessment matrix 224. The two-dimensional matrix 720 may be created by mapping the customer—product matrix 718 with the prospect profile 222. The process 700 may further include a step 708 for creation of a decision tree 722. The decision tree 722 may be similar to the decisional pathway 226. The decision tree 722 may be created by mapping the comparison between the prospect profile 222 and the two-dimensional matrix 720. The decision tree 722 may be deployed for validating the likelihood value 232 for each of the products by a particular client as determined by the two-dimensional matrix 720. The process 700 may further include a step 710 for the generation of a table 724. The table 724 may include product recommendations from the two-dimensional matrix 720 that have been successfully validated by the decision tree 722. The product recommendations from the table may have a high likelihood of resulting in a "won deal" situation.

Figure 8:
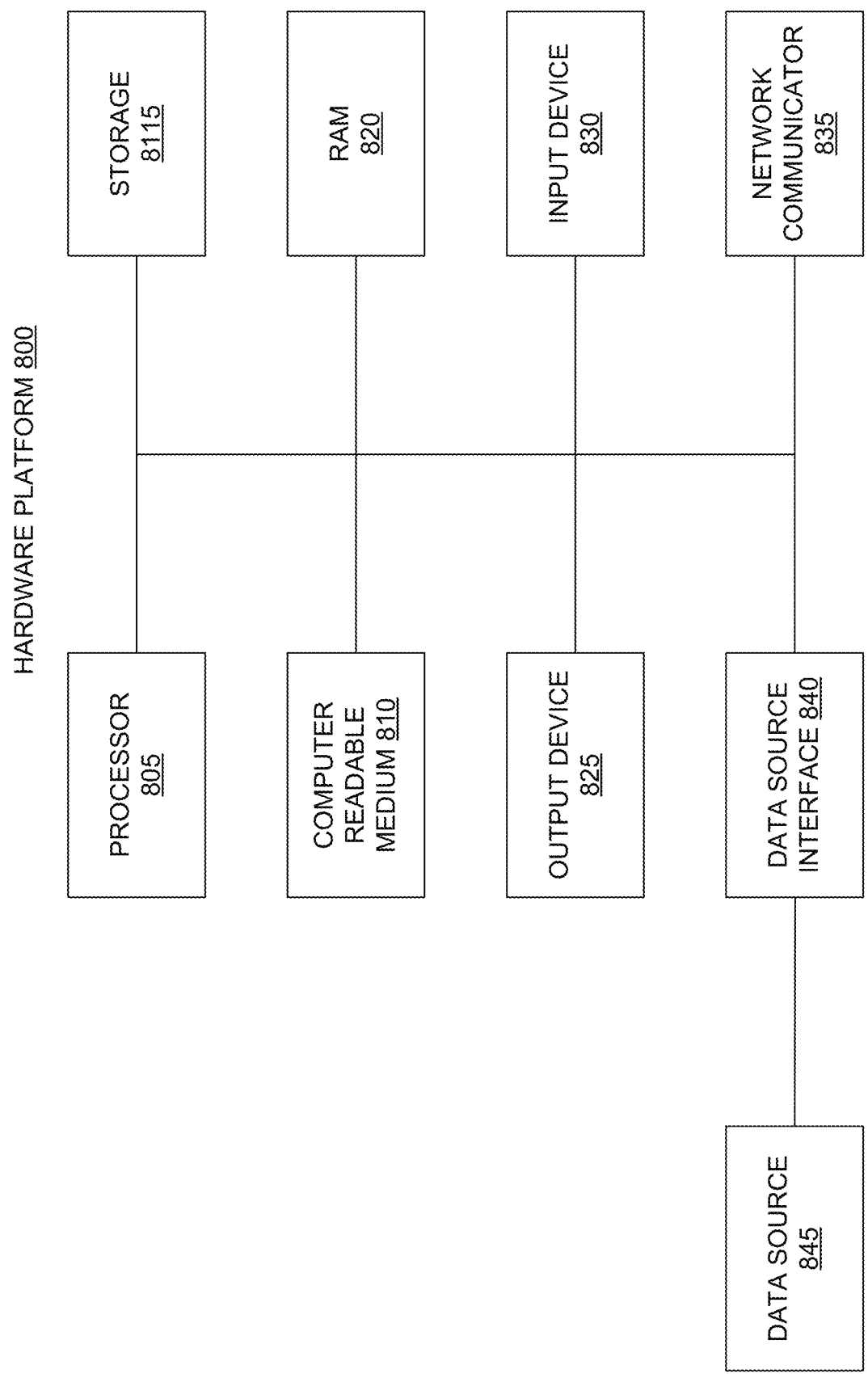
FIG. 8 illustrates a hardware platform for the implementation of a prospect recommendation system, according to an example embodiment of the present disclosure.

FIG. 8 illustrates a hardware platform 800 for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 800. The hardware platform 800 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 8, the hardware platform 800 may be a computer system 800 that may be used with the examples described herein. The computer system 800 may represent a computational platform that includes components that may be in a server or another computer system. The computer system 800 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 800 may include a processor 805 that executes software instructions or code stored on a non-transitory computer-readable storage medium 810 to perform methods of the present disclosure. The software code includes, for example, instructions to gather data and documents and analyze documents. In an example, the data analyzer 130, the prospect analyzer 140 and the prospect predictor 150 may be software codes or components performing these steps.

The instructions on the computer-readable storage medium 810 are read and stored the instructions in storage 815 or in random access memory (RAM) 820. The storage 815 provides a large space for keeping static data where at least some instructions could be stored for later execution. The stored instructions may be further compiled to generate other representations of the instructions and dynamically stored in the RAM 820. The processor 805 reads instructions from the RAM 820 and performs actions as instructed.

The computer system 800 further includes an output device 825 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 800 further includes input device 830 to provide a user or another device with mechanisms for entering data and/or otherwise interact with the computer system 800. The input device may include, for example, a keyboard, a keypad, a mouse, or a touchscreen. In an example, the output of the prospect analyzer 140 is displayed on the output device 825. Each of these output devices 825 and input devices 830 could be joined by one or more additional peripherals. In an example, the output device 825 may be used to display the results of the prospect assessment requirement 202.

A network communicator 835 may be provided to connect the computer system 800 to a network and in turn to other devices connected to the network including other clients, servers, data stores, and interfaces, for instance. A network communicator 835 may include, for example, a network adapter such as a LAN adapter or a wireless adapter. The computer system 800 includes a data source interface 840 to access data source 845. A data source is an information resource. As an example, a database of exceptions and rules may be a data source. Moreover, knowledge repositories and curated data may be other examples of data sources. In an example, the plurality of data sources 206 may be the data source 845.

Figure 9A:
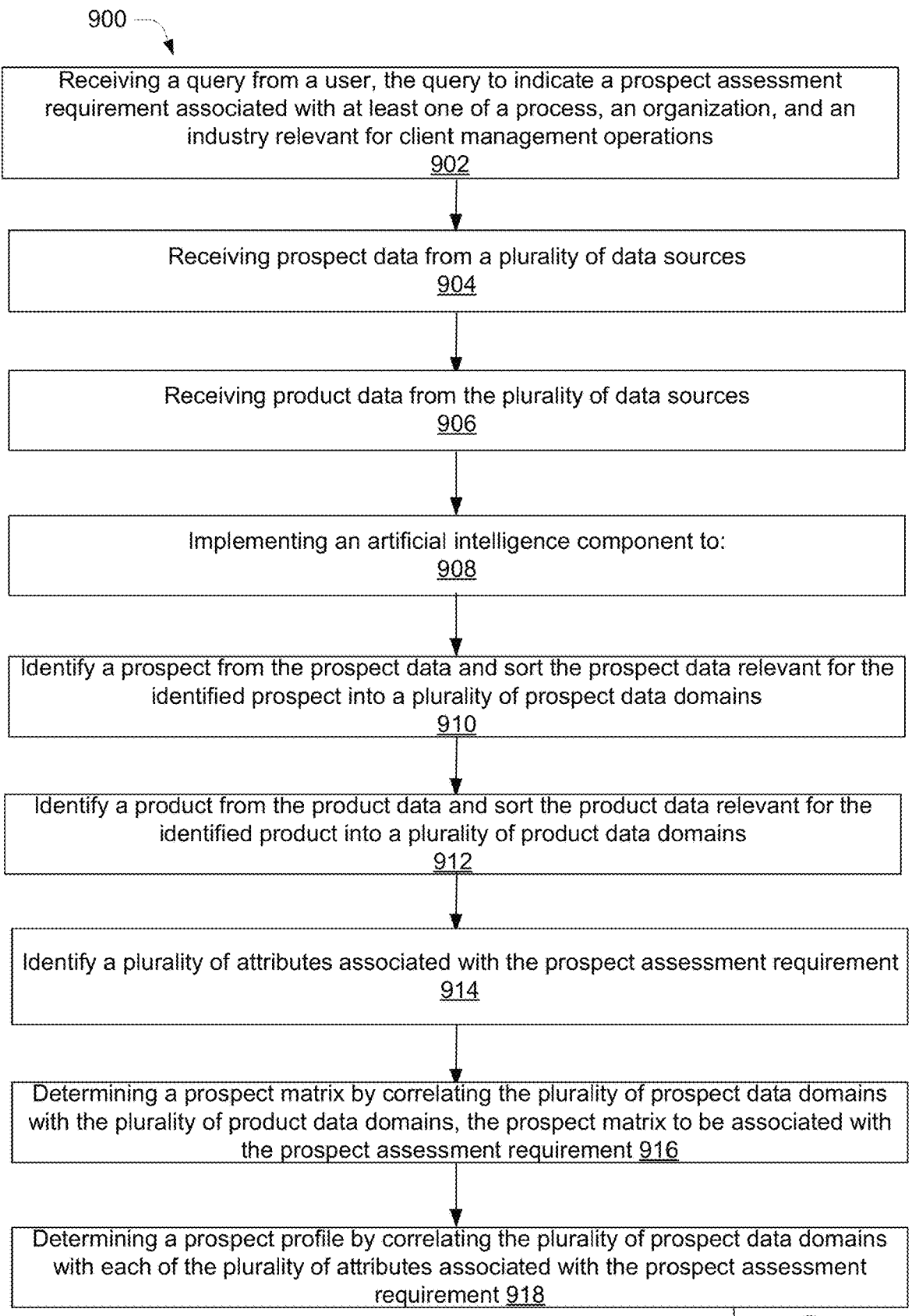
FIGS. 9A and 9B illustrate a process flowchart for a prospect recommendation system, according to an example embodiment of the present disclosure.
Figure 9B:
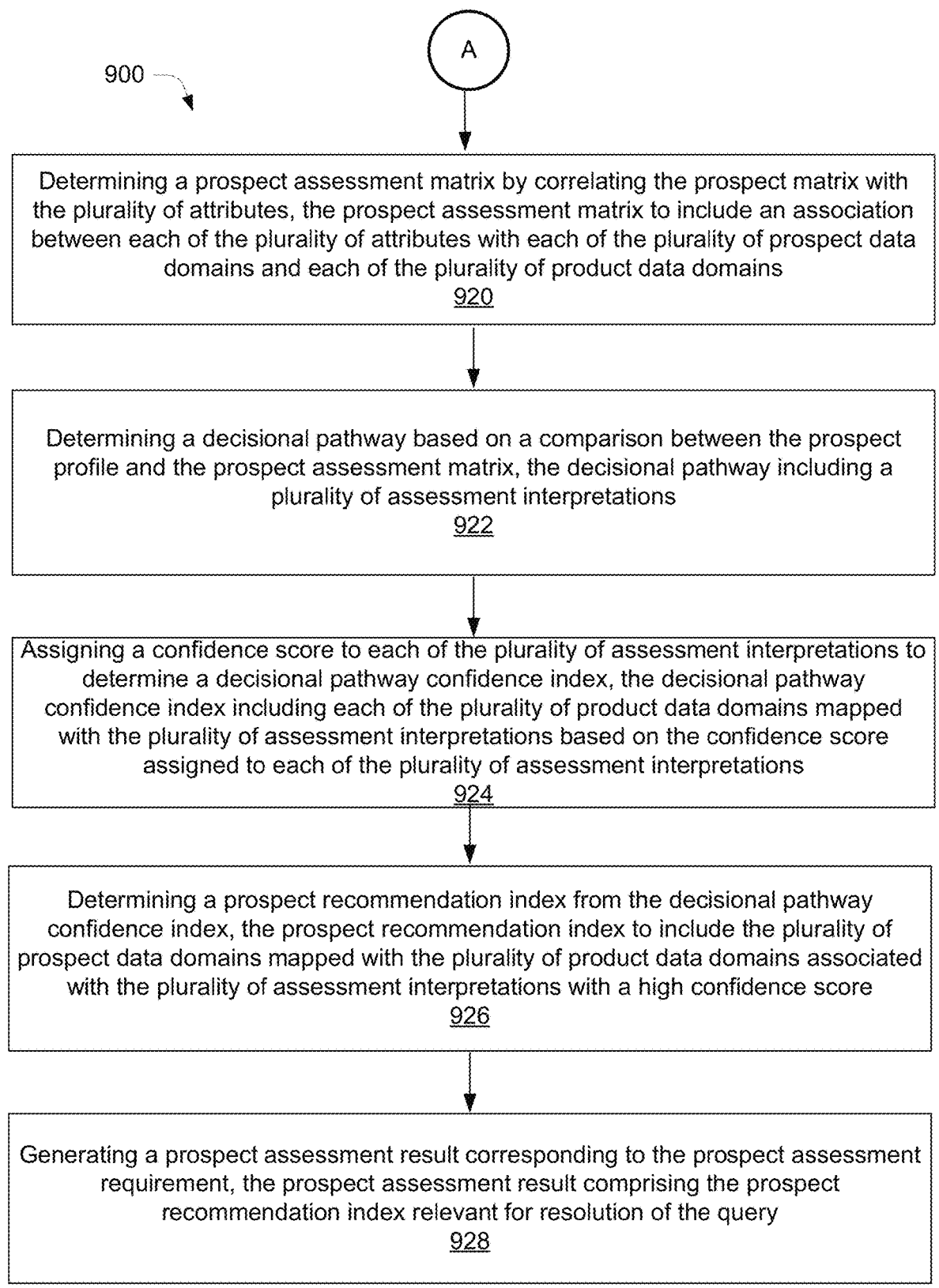

FIGS. 9A and 9B illustrate a method 900 $|_{[KSS5]}$ for the prospect recommendation system 110 according to an example embodiment of the present disclosure.

It should be understood that method steps are shown here for reference only and other combinations of the steps may be possible. Further, the method 900 may contain some steps in addition to the steps shown in FIG. 9. For the sake of brevity, construction and operational features of the system 90 which are explained in detail in the description of FIG. 1, FIG. 2, FIG. 3, FIG. 4, FIG. 5, FIG. 6, FIG. 7A, FIG. 7B, and FIG. 8 are not explained in detail in the description of FIG. 9. The method 900 may be performed by a component of the system 110, such as the processor 120, the data analyzer 130, the prospect analyzer 140 and the prospect predictor 150.

At block 902, a query may be received from a user. The query may be the query to indicate the prospect assessment requirement 202. The prospect assessment requirement 202 may be associated with at least one of a process, an organization, and an industry-relevant for client management operations.

At block 904, prospect data 204 may be received from a plurality of data sources 206.

At block 906, product data 212 may be received from a plurality of data sources 206.

At block 908, the artificial intelligence component 218 may be implemented on the prospect data 204 and product data 212.

At block 910, the artificial intelligence component 218 may identify a prospect from the prospect data 204 and sort the prospect data 204 relevant for the prospect into the plurality of prospect data domains 208.

At block 912, the artificial intelligence component 218 may identify a product from the product data 212 and sort the product data 212 relevant for the product into the plurality of product data domains 214.

At block 914, the artificial intelligence component 218 may identify the plurality of attributes 216 associated with the prospect assessment requirement 202.

At block 916, the prospect matrix 220 may be determined. The prospect matrix 220 may be determined by correlating the prospect data 204 with the product data 212. The prospect matrix 220 may be associated with the prospect assessment requirement 202.

At block 918, the prospect profile 222 may be determined by correlating the plurality of prospect data domains 208 with each of the plurality of product data domains 214 and each of the plurality of attributes 216 associated with the prospect assessment requirement 202.

At block 920, prospect assessment matrix 224 may be determined by correlating the prospect matrix 220 with the plurality of attributes 216. The prospect assessment matrix 224 may include an association between each of the plurality of attributes 216 with each of the plurality of prospect data domains 208 and each of the plurality of product data domains 214.

At block 922, a decisional pathway 226 may be determined based on a comparison between the prospect profile 222 and the prospect assessment matrix 224. The decisional pathway 226 may include a plurality of assessment interpretations 228 interlinked through a plurality of mapped connections.

At block 924, a confidence score 230 may be assigned to each of the plurality of assessment interpretations 228 to determine the decisional pathway confidence index 234. The decisional pathway confidence index 234 may include each of the plurality of product data domains 214 mapped with the plurality of assessment interpretations 228 based on the confidence score 230 assigned to each of the plurality of assessment interpretations 228.

At block 926, the prospect recommendation index 236 may be determined from the decisional pathway confidence index 234. The prospect recommendation index 236 may include the plurality of prospect data domains 208 mapped with the plurality of product data domains 214 that are associated with the plurality of assessment interpretations 228 with a high confidence score 230.

At block 928, the prospect assessment result 244 may be generated corresponding to the prospect assessment requirement 202. The prospect assessment result 244 may comprise the prospect recommendation index 236 relevant for the resolution of the query.

In an example, the method 900 may further include the product concession index 240, which may be determined by the prospect predictor 150 based on the prospect profile 222 and the prospect recommendation index 236. The product concession index 240 to include the plurality of concessions 242 associated each of the plurality of product data domains 214 attributed to a prospect from the plurality of prospect data domains 208. In an example, the method 900 may include deploying an algorithmic medium to determine each of the plurality of concessions 242 and assign the confidence value 238 based on the algorithmic medium to each of the plurality of concessions 242.

In an example, the method 900 may comprise creating a prospect assessment library, by associating the prospect recommendation index 236, and the prospect profile 222 with the prospect assessment requirement 202. The method 900 may further comprise deploying the prospect assessment library for validation of the prospect recommendation index 236 for the generation of the prospect assessment result 244.

In an example, the method 900 may be practiced using a non-transitory computer-readable medium. In an example, the method 900 may be a computer-implemented method.

The present disclosure provides for a prospect recommendation system that may generate product quotations, discounts, and service terms for prospective clients and provide the best options available and may also provide efficient insight-driven sales operations while incurring minimal costs. Furthermore, the present disclosure may categorically analyze various parameters that may have an impact on deciding an appropriate quotation regarding products, discounts, service terms One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
   a processor;
   a memory storing instructions, which when executed by the processor, cause the system to:
      receive a query from a user, the query indicating a prospect assessment requirement associated with at least one of a process, an organization, and an industry associated with a client management operation;
      identify a prospect from prospect data received from a plurality of data sources and sort the prospect data relevant to the identified prospect into a plurality of prospect data domains by implementing artificial intelligence techniques using said processor;
      identify a product from product data received from the plurality of data sources and sort the product data relevant to the identified product into a plurality of product data domains;
      identify a plurality of attributes associated with the prospect assessment requirement;
      determine a prospect matrix by correlating the plurality of prospect data domains with the plurality of product data domains, the prospect matrix to be associated with the prospect assessment requirement;
      determine a prospect profile by correlating the plurality of prospect data domains with each of the plurality of attributes associated with the prospect assessment requirement;
      determine a prospect assessment matrix by correlating the prospect matrix with the plurality of attributes, the prospect assessment matrix to include an association between each of the plurality of attributes with each of the plurality of prospect data domains and each of the plurality of product data domains;
      determine a decisional pathway based on a comparison between the prospect profile and the prospect assessment matrix, the decisional pathway including a plurality of assessment interpretations, wherein the decision pathway is determined by interlinking each of the plurality of assessment interpretations based on an analysis of a relationship between the prospect profile and the prospect assessment matrix;
      assign a confidence score to each of the plurality of assessment interpretations to determine a decisional pathway confidence index, the decisional pathway confidence index including each of the plurality of product data domains mapped with the plurality of assessment interpretations based on the confidence score assigned to each of the plurality of assessment interpretations;
      automatically update the confidence score to each of the plurality of assessment interpretations;
      determine a prospect recommendation index from the decisional pathway confidence index, the prospect recommendation index to include the plurality of prospect data domains mapped with the plurality of product data domains associated with the plurality of assessment interpretations with a high confidence score;
      determine a product concession index based on the prospect profile and the prospect recommendation index to predict a service level for the prospect, the product concession index to include a plurality of concessions associated with each of the plurality of product data domains attributed to the prospect from the plurality of prospect data domains, wherein the plurality of concessions are determined by deploying a plurality of algorithms for building a prediction model for the prediction of the service level;
      assign a confidence value to each of the plurality of concessions based on the corresponding algorithm, wherein the confidence value indicates a weightage assigned to the corresponding algorithm, and wherein the weightage represents an ability of the respective algorithm to correctly predict the service level;
      compute a final prediction for the service level for the prospect as a weighted combination of the plurality of algorithms;

generate a prospect assessment result corresponding to the prospect assessment requirement, the prospect assessment result comprising the prospect recommendation index and the final prediction relevant for resolution of the query, wherein the prospect assessment result indicates a cluster of products along with the service level for the prospect; and based on the prospect assessment result, facilitate upgrading and updating existing products with the cluster of products along with the service level to a procurement portfolio associated with the at least one of the process, the organization, and the industry associated with the client management operation.

2. The system as claimed in claim 1, wherein the product concession index further includes a discount percentage associated with each of the plurality of product data domains attributed to the prospect from the plurality of prospect data domains.

3. The system as claimed in claim 1, wherein the processor is to generate the prospect assessment result as an electronic document in response to the query of the user.

4. The system as claimed in claim 1, wherein the processor is to further create a prospect assessment library by associating the prospect recommendation index and the prospect profile with the prospect assessment requirement.

5. The system as claimed in claim 4, wherein the system is to further deploy the prospect assessment library to validate the prospect recommendation index for generation of the prospect assessment result.

6. A method comprising:
receiving, by a processor, a query from a user, the query to indicate a prospect assessment requirement associated with at least one of a process, an organization, and an industry-relevant for client management operations;
receiving, by the processor, prospect data and product data from a plurality of data sources;
identifying, by the processor, a prospect from the prospect data and sort the prospect data relevant for the prospect into a plurality of prospect data domains by implementing artificial intelligence techniques using said processor;
identifying, by the processor, a product from the product data and sort the product data relevant for the product into a plurality of product data domains;
identifying, by the processor, a plurality of attributes associated with the prospect assessment requirement;
determining, by the processor, a prospect matrix by correlating the plurality of prospect data domains with the plurality of product data domains, the prospect matrix to be associated with the prospect assessment requirement;
determining, by the processor, a prospect profile by correlating the plurality of prospect data domains with each of the plurality of attributes associated with the prospect assessment requirement;
determining, by the processor, a prospect assessment matrix by correlating the prospect matrix with the plurality of attributes, the prospect assessment matrix to include an association between each of the plurality of attributes with each of the plurality of prospect data domains and each of the plurality of product data domains;
determining, by the processor, a decisional pathway based on a comparison between the prospect profile and the prospect assessment matrix, the decisional pathway including a plurality of assessment interpretations, wherein the decision pathway is determined by interlinking each of the plurality of assessment interpretations based on an analysis of a relationship between the prospect profile and the prospect assessment matrix;
assigning, by the processor, a confidence score to each of the plurality of assessment interpretations to determine a decisional pathway confidence index, the decisional pathway confidence index including each of the plurality of product data domains mapped with the plurality of assessment interpretations based on the confidence score assigned to each of the plurality of assessment interpretations;
automatically updating, by the processor, the confidence score to each of the plurality of assessment interpretations;
determining, by the processor, a prospect recommendation index from the decisional pathway confidence index, the prospect recommendation index to include the plurality of prospect data domains mapped with the plurality of product data domains associated with the plurality of assessment interpretations with a high confidence score;
determining, by the processor, a product concession index based on the prospect profile and the prospect recommendation index to predict a service level for the prospect, the product concession index to include a plurality of concessions associated with each of the plurality of product data domains attributed to the prospect from the plurality of prospect data domains, wherein the plurality of concessions are determined by deploying a plurality of algorithms for building a predictive model for the prediction of the service level;
assigning, by the processor, a confidence value to each of the plurality of concessions based on the corresponding algorithm, wherein the confidence value indicates a weightage assigned to the corresponding algorithm, and wherein the weightage represents an ability of the respective algorithm to correctly predict the service level;
computing, by the processor, a final prediction for the service level for the prospect as a weighted combination of the plurality of algorithms;
generating, by the processor, a prospect assessment result corresponding to the prospect assessment requirement, the prospect assessment result comprising the prospect recommendation index and the final prediction relevant for resolution of the query, wherein the prospect assessment result indicates a cluster of products along with the service level for the prospect; and
based on the prospect assessment result, facilitating upgrading and updating existing products with the cluster of products along with the service level to a procurement portfolio associated with the at least one of the process, the organization, and the industry associated with the client management operation.

7. The method as claimed in claim 6, wherein the product concession index further includes a discount percentage associated with each of the plurality of product data domains attributed to the prospect from the plurality of prospect data domains.

8. The method as claimed in claim 6, wherein the method further comprises generating, by the processor, the prospect assessment result as an electronic document in response to the query of the user.

9. The method as claimed in claim 6, wherein the method further comprises creating, by the processor, a prospect assessment library, by associating the prospect recommendation index, and the prospect profile with the prospect assessment requirement.

10. The method as claimed in claim 9, Wherein the method further comprises deploying, by the processor, the prospect assessment library to validate the prospect recommendation index for generation of the prospect assessment result.

11. A non-transitory computer readable medium including machine readable instructions executable by a processor to:
receive a query from a user, the query to indicate a prospect assessment requirement associated with at least one of a process, an organization, and an industry-relevant for client management operations;
receive prospect data and product data from a plurality of data sources;
 identify a prospect from the prospect data and sort the prospect data relevant for the prospect into a plurality of prospect data domains by implementing artificial intelligence techniques using said processor;
 identify a product from the product data and sort the product data relevant for the product into a plurality of product data domains;
 identify a plurality of attributes associated with the prospect assessment requirement;
determine a prospect matrix by correlating the plurality of prospect data domains with the plurality of product data domains, the prospect matrix to be associated with the prospect assessment requirement;
determine a prospect profile by correlating the plurality of prospect data domains with each of the plurality of attributes associated with the prospect assessment requirement;
determine a prospect assessment matrix by correlating the prospect matrix with the plurality of attributes, the prospect assessment matrix to include an association between each of the plurality of attributes with each of the plurality of prospect data domains and each of the plurality of product data domains;
determine a decisional pathway based on a comparison between the prospect profile and the prospect assessment matrix, the decisional pathway including a plurality of assessment interpretations, wherein the decision pathway is determined by interlinking each of the plurality of assessment interpretations based on an analysis of a relationship between the prospect profile and the prospect assessment matrix;
assign a confidence score to each of the plurality of assessment interpretations to determine a decisional pathway confidence index, the decisional pathway confidence index including each of the plurality of product data domains mapped with the plurality of assessment interpretations based on the confidence score assigned to each of the plurality of assessment interpretations;
automatically update the confidence score to each of the plurality of assessment interpretations;
determine a prospect recommendation index from the decisional pathway confidence index, the prospect recommendation index to include the plurality of prospect data domains mapped with the plurality of product data domains associated with the plurality of assessment interpretations with a high confidence score;
determine a product concession index based on the prospect profile and the prospect recommendation index to predict a service level for the prospect, the product concession index to include a plurality of concessions associated with each of the plurality of product data domains attributed to the prospect from the plurality of prospect data domains, wherein the plurality of concessions are determined by deploying a plurality of algorithms for building a predictive model for the prediction of the service level;
assign a confidence value to each of the plurality of concessions based on the corresponding algorithm, wherein the confidence value indicates a weightage assigned to the corresponding algorithm, and wherein the weightage represents an ability of the respective algorithm to correctly predict the service level;
compute a final prediction for the service level for the prospect as a weighted combination of the plurality of algorithms;
generate a prospect assessment result corresponding to the prospect assessment requirement, the prospect assessment result comprising the prospect recommendation index and the final prediction relevant for resolution of the query, wherein the prospect assessment result indicates a cluster of products along with the service level for the prospect; and
based on the prospect assessment result, facilitate upgrading and updating existing products with the cluster of products along with the service level to a procurement portfolio associated with the at least one of the process, the organization, and the industry associated with the client management operation.

12. The non-transitory computer-readable medium of claim 11, wherein the product concession index further including a discount percentage associated with each of the plurality of product data domains attributed to the prospect from the plurality of prospect data domains.

13. The non-transitory computer-readable medium of claim 11, wherein the processor is to generate the prospect assessment result as an electronic document in response to the query of the user.

14. The non-transitory computer-readable medium of claim 11, wherein the processor is to create a prospect assessment library, by associating the prospect recommendation index, and the prospect profile with the prospect assessment requirement.

* * * * *

UNITED STATES PATENT AND TRADEMARK OFFICE
CERTIFICATE OF CORRECTION

PATENT NO. : 11,182,841 B2
APPLICATION NO. : 16/678844
DATED : November 23, 2021
INVENTOR(S) : Ravi Shankar Nori et al.

It is certified that error appears in the above-identified patent and that said Letters Patent is hereby corrected as shown below:

In the Claims

In Column 39, Line 4, Claim 10, reads "Wherein" should read "wherein".

Signed and Sealed this
Seventeenth Day of May, 2022

Katherine Kelly Vidal
*Director of the United States Patent and Trademark Office*